APPARATUS FOR EDITING AND CORRECTING DISPLAYED TEXT

Filed May 14, 1970 10 Sheets-Sheet 1

INVENTORS
WALTER G. FREDRICKSON,
ALBERT W. HEITMANN,
GEORGE M. JONES,
& HOWARD A. THRAILKILL
BY William J. Flynn
ATTORNEY

APPARATUS FOR EDITING AND CORRECTING DISPLAYED TEXT

Filed May 14, 1970 10 Sheets-Sheet 2

INVENTORS
WALTER G. FREDRICKSON,
ALBERT W. HEITMANN,
GEORGE M. JONES,
& HOWARD A. THRAILKILL
BY William J. Flynn
ATTORNEY

APPARATUS FOR EDITING AND CORRECTING DISPLAYED TEXT

INVENTORS
WALTER G. FREDRICKSON,
ALBERT W. HEITMANN,
GEORGE M. JONES,
& HOWARD A. THRAILKILL
BY William J. Flynn
ATTORNEY INVENTORS
WALTER G. FREDRICKSON,
ALBERT W. HEITMANN,
GEORGE M. JONES,
& HOWARD A. THRAILKILL
BY William J. Flynn
ATTORNEY INVENTORS
WALTER G. FREDRICKSON,
ALBERT W. HEITMANN,
GEORGE M. JONES,
& HOWARD A. THRAILKILL
BY
William J. Flynn
ATTORNEY

APPARATUS FOR EDITING AND CORRECTING DISPLAYED TEXT

INVENTORS
WALTER G. FREDRICKSON,
ALBERT W. HEITMANN,
GEORGE M. JONES,
& HOWARD A. THRAILKILL
BY William J. Flynn
ATTORNEY INVENTORS
WALTER G. FREDRICKSON
ALBERT W. HEITMANN,
GEORGE M. JONES,
& HOWARD A. THRAILKILL
BY William J. Flynn
ATTORNEY INVENTORS
WALTER G. FREDRICKSON,
ALBERT W. HEITMANN,
GEORGE M. JONES,
& HOWARD A. THRAILKILL
BY William J. Flynn
ATTORNEY

APPARATUS FOR EDITING AND CORRECTING DISPLAYED TEXT

Filed May 14, 1970 10 Sheets-Sheet 9

INVENTORS
WALTER G. FREDRICKSON,
ALBERT W. HEITMANN,
GEORGE M. JONES,
& HOWARD A. THRAILKILL
BY William J. Flynn
ATTORNEY Dec. 12, 1972 W. G. FREDRICKSON ET AL 3,706,075

APPARATUS FOR EDITING AND CORRECTING DISPLAYED TEXT

Filed May 14, 1970 10 Sheets-Sheet 10

INVENTORS
WALTER G. FREDRICKSON,
ALBERT W. HEITMANN,
GEORGE M. JONES
& HOWARD A. THRAILKILL
BY William J. Flynn
ATTORNEY 3,706,075

APPARATUS FOR EDITING AND CORRECTING DISPLAYED TEXT

Walter G. Fredrickson, Indialantic, Albert W. Heitmann, Melbourne, George M. Jones, Indian Harbour Beach, and Howard A. Thrailkill, Indialantic, Fla., assignors to Harris-Intertype Corporation, Cleveland, Ohio Filed May 14, 1970, Ser. No. 37,177
Int. Cl. G06f *3/14*
U.S. Cl. 340—172.5 22 Claims

ABSTRACT OF THE DISCLOSURE

A console for keyboard editing and correcting of text, such as newspaper copy, displayed on the screen of a cathode ray tube. The encoded text copy is recirculated in a refresh memory having a large capacity dynamic shift register and a small capacity random access memory where various editing and correcting changes may be made. The text displayed on the cathode ray screen may be "rolled up" or "rolled down" one line at a time as the editing proceeds. Any selected block of the text may be transmitted from the output of the recirculating memory to an output device, such as a punch, and deleted from the refresh memory at the same time.

This invention relates to an editing and correcting apparatus which is particularly adapted for use with unedited or unproofed text to enable editing changes and corrections to be entered from a keyboard, with the text being displayed visually as the editing and correcting proceeds, after which the final edited and corrected copy may be used as the input to a computer or an automatic typesetter.

A principal object of this invention is to provide such a novel and improved editing and correcting apparatus which is extremely flexible in the variety of copy changes which it can perform.

Another object of this invention is to provide such an apparatus having a refresh memory, from which is obtained the visual display of the text being edited and corrected, which combines the low cost of a dynamic shift register for large data storage capacity and the flexibility of a smaller capacity random access memory in which the changes are made.

Another object of this invention is a novel and improved editing and correcting apparatus having novel provision for "rolling up" or "rolling down" the multiline text display.

Another object of this invention is to provide a novel and improved editing and correcting apparatus in which any selected block of the edited and corrected text may be transmitted to an output device, such as a punch, and deleted from the refresh memory at the same time.

Further objects and advantages of this invention will be apparent from the following description of a presently-preferred embodiment, described with reference to the accompanying drawings in which.

SYSTEM OUTLINE

Figure 1:
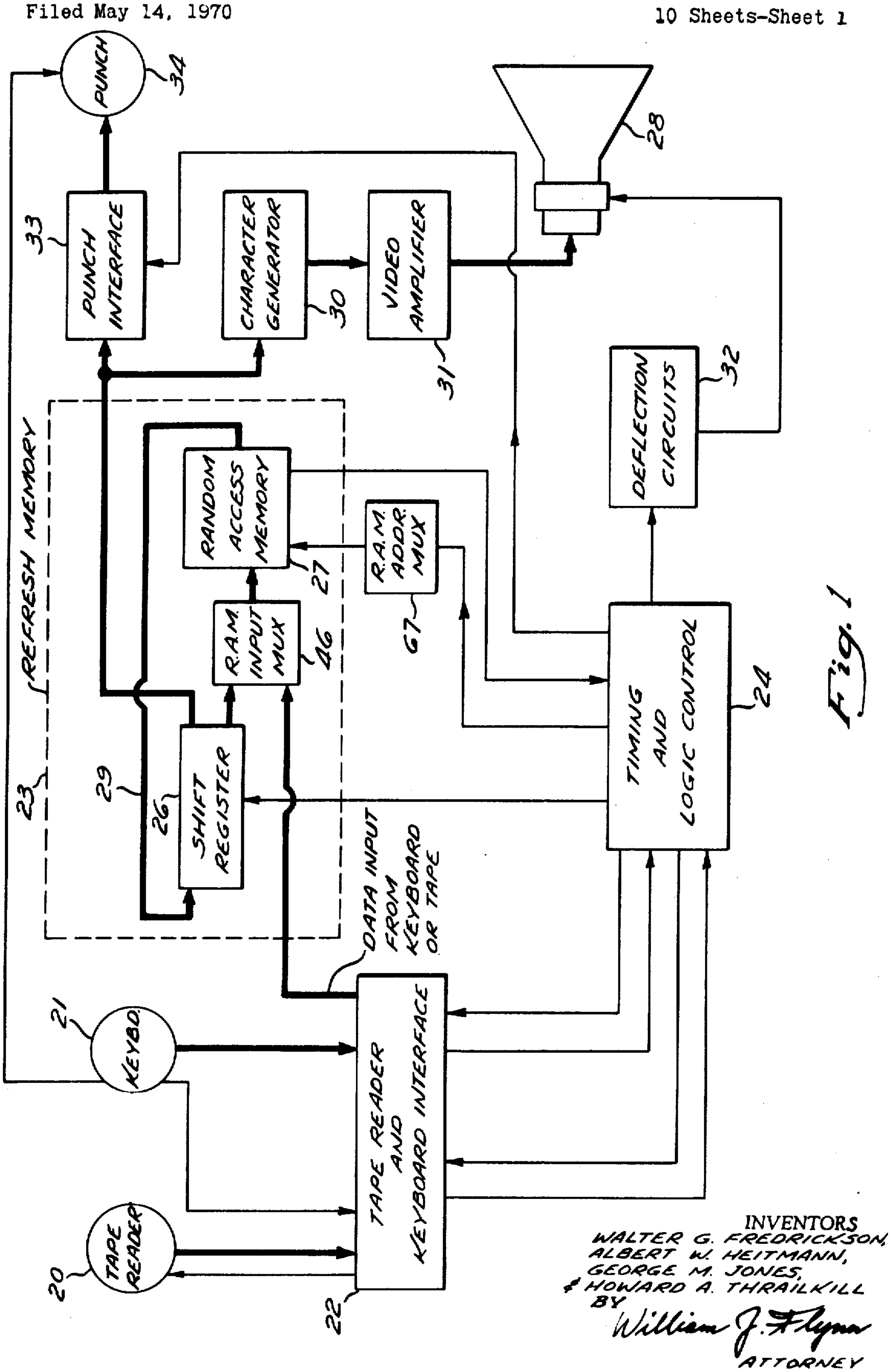
FIG. 1 is a schematic block diagram of a system embodying the present apparatus.

Referring to FIG. 1, a complete system embodying the present invention is disclosed as comprising data input devices in the form of a tape reader 20 and a keyboard apparatus 21. The respective outputs of the tape reader and the keyboard apparatus are connected through an interface 22 to the input of a refresh memory 23 under the control of a timing and control logic section 24.

The tape reader 20 reads a conventional 6-track encoded punched tape containing the unedited or unproofed text which is to be edited or corrected by an operator using the apparatus of the present invention. This text may be line-justified, such as newspaper copy provided by a wire service, such as the Associated Press or United Press International, or it may be unjustified, blind keyboarded tape which originates from local copy.

The interface 22 performs two principal functions with respect to the output from the tape reader 20:

(1) it accepts 6-bit characters read by the tape reader and inserts them into the refresh memory 23;
(2) it "strips" (rejects) special codes, such as for line justification spaces, appearing on the input tape, so that these special codes are not transmitted to the refresh memory input.

The keyboard apparatus 21 is manually operated by the person using the present editing console to produce individual binary-coded alphanumeric characters and special function codes. The keyboard apparatus itself encodes the selected alpha-numeric character into a standard 6-bit code, which is then transmitted by the interface 22 to the refresh memory input. Each special function key in the keyboard apparatus operates a switch which produces a D.C. level that the interface 22 then encodes before transmitting to the refresh memory input. The interface 22 contains encoding logic for this purpose, the details of which are omitted from this description as unnecessary to an understanding of the invention.

The refresh memory 23 comprises a relatively large capacity recirculating memory in the form of a dynamic shift register 26 and a random access memory 27 of much smaller capacity. All data entries into the refresh memory 23 are made into the random access memory 27 through an input multiplexer 46 under the control of an address multiplexer 67, and the data thus entered is recirculated back into the recirculating memory 26. The data read-out from the refresh memory takes place at the output of its recirculating memory 26.

The dynamic shift register 26 preferably has metal oxide semiconductor (MOS) storage elements and is capable of storing 2000 or more 8-bit codes. The shift register continuously recirculates to enable characters to be displayed on the face of a cathode ray tube 28 at a 60 cycle per second refresh rate, as explained hereinafter.

The random access memory 27 is connected through its input multiplexer 46 to the output of the dynamic shift register 26 and it has a storage capacity of 32 8-bit codes. The random access memory 27 together with the shift register 26 enables the unedited text input from the tape reader 20 which is being recirculated in the refresh memory to be edited in accordance with entries from the keyboard apparatus 21, such as deleting a character and/or inserting a character from the keyboard into a selected location in the text. Any one of the 32 storage addresses or character positions in the random access memory 27 can be accessed under the control of the timing and control logic section 24. That is, the editing change is actually made in the random access memory 27 and then the changed text is recirculated back through the shift register 26 via a feedback circuit 29, so that in the following cycle of operation the next displayed on the screen will include any changes made in the preceding cycle of operation. The time rate of recirculation of successive characters in the shift register 26 is not changed by the editing entries made in the random access memory 27.

The output of the shift register 26 is connected to the input of a character generator 30, which translates the encoded text output from the shift register into a serial pulse train output for turning on and off the beam of the cathode ray tube 28. The character generator 30 includes a large capacity read-only memory which may be accessed by a character code to cause a corresponding unique sequence of serial pulses to be generated. The serial pulse output from the character generator 30 is applied through a video amplifier 31 to the control grid of the cathode ray tube to turn the beam on and off in timed relationship to the vertical and horizontal deflection of the beam by deflection circuits 32 controlled by the timing and control logic section 24.

The deflection circuits 32 produce a rectangular raster scan for each individual alphanumeric character to be displayed. Preferably, the raster scan is in the form of a series of contiguous, side by side, upward vertical sweeps. During each vertical sweep the beam may be turned on and off by the video amplifier 31 to produce a vertical, straight line segment, or stroke, of the character. After the completion of each vertical sweep, the beam is blanked during its rapid retrace down to the bottom of the next vertical sweep position to the right in the raster. It will be recognized that, due to inter-character spacing, the character being "painted" in this manner does not occupy the full horizontal width of the raster in which it will appear, and therefore the beam will be blanked throughout the vertical sweeps occurring near the left and right edges of the raster.

The output of the dynamic shift register 26 also is connected to a tape punch interface 33 which, under the control of the timing and control logic section 24, may be actuated from the keyboard apparatus 21 to pass the final edited text from the output of the shift register 26 to a tape punch 34. The punch interface 33 controls the physical operations of the hole-punching elements in the tape punch 34. The edited output tape produced by the tape punch them may be used to provide the input to an automatic typesetter of known design, including, but not limited to, various types of photo-typesetters and computer-operated typesetters.

The sequencing of the events in this system and the operation of the various components so far described are under the control of the timing and control logic section 24. The timing and control logic develops a master clock pulse train which is used to synchronize the rate at which the unedited text is read by the tape reader 20 and uses that clock train to determine the rate at which characters are inserted into the shift register 26, and thus determines the rate at which the tape reader must read in order to input this data. At the output end of the system, the timing and control logic 24 makes the edited text data available to the tape punch 34 at the rate at which the tape punch must accept it. The timing and control logic 24 also controls the accessing of data in the random access memory 27 for editing and other changes, and it synchronizes the analog sweep signals provided by the deflection circuits 32 to the beam deflection elements of the cathode ray tube to the rate at which the digital beam turn-on and turn-off signals are produced by the signal generator 30, so that the characters will occur at the correct positions on the face of the cathode ray tube.

The timing and control logic 24 contains all of the "hard-wired" integrated-circuit logic that, in effect, constitutes the algorithms that perform the various different editing functions under the control of the keyboard apparatus 21—i.e., how the random access memory 27 is accessed, how and when data is transferred back and forth, etc. For example, to insert a character from the keyboard apparatus 21 into the random access memory 27, a predetermined sequence of events occurs in accordance with the logic permanently wired into the timing and control logic 24. Thus, for each editing function which the operator may want to perform there is a fixed sequence of a priori instructions wired into the timing and control logic 24 which it gives to the random access memory 27 to insure that the desired editing function is performed.

FIG. 2

Figure 2:
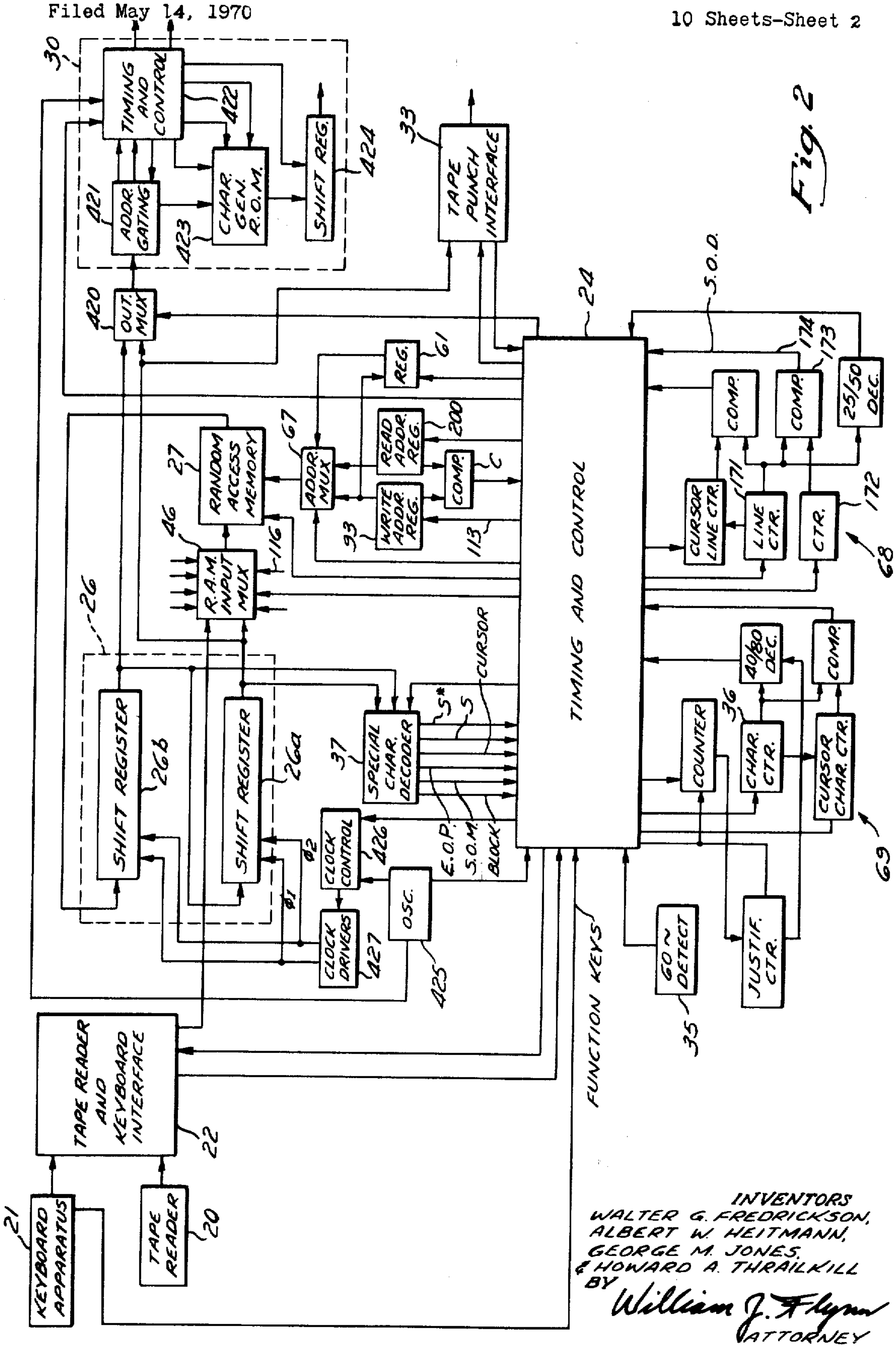
FIG. 2 shows the FIG. 1 system in greater detail.

FIG. 2 shows in greater detail a system whose general outline has been described with reference to FIG. 1. In FIG. 2 the recirculating memory 26 is shown as having two dynamic shift registers **26*a* and 26*b*, each having a storage capacity of about 2000 characters. At any given time, not more than half the storage capacity of the total recirculating memory 26 in FIG. 2 is made available to the cathode ray tube 28**. For example, in the "roll up" mode, as described hereinafter, the successive lines of text can be caused to move up, one line at a time, off the face of the cathode ray tube, and as one line moves off at the top a new line of text appears at the bottom. This special operational mode is described in detail hereinafter.

Normally, the input multiplexer 46 enables the output of the shift register **26*a* into the random access memory 27. However, when the keyboard apparatus 21 or any one of several special instruction codes is enabled, the multiplexer 46 disables the normal input from the shift register into the random access memory. The special character decoder 37** is connected to the shift register to detect when any of these special codes (SOM, EOD, Block, Cursor, S (blank space) or S* (end-of-line) is present at the shift register output and to provide a corresponding enable signal to the input multiplexer 46 via the timing and control logic section 24.

Figure 10:
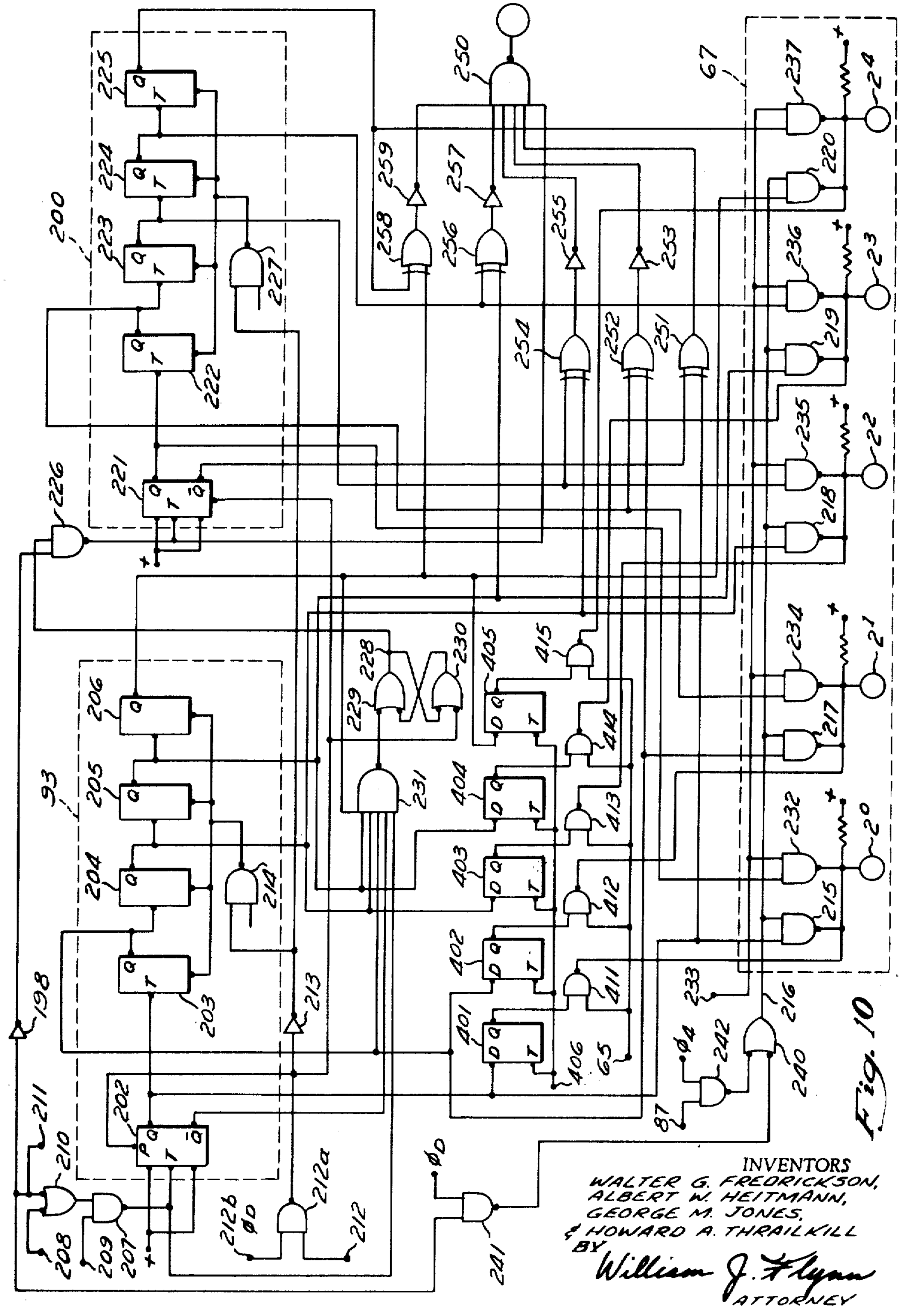
FIG. 10 illustrates schematically the address registers and the address multiplexer for the random access memory in the present apparatus.

The address multiplexer 67 controls the accessing into the random access memory 27 of the write address register 93, the read address register 200 and the wrap write address register 61 as explained in detail hereinafter. A comparison circuit C, to be described in detail with reference to FIG. 10, compares the counts stored in registers 93 and 200. Normally, these counts are 30 apart, but if they coincide (as a result of a particular editing operation) this fact is detected by comparison circuit C which then provides a control signal to the timing and control logic section 24 so as to interrupt for the remainder of that particular refresh cycle whatever editing operation is then taking place. This is explained in detail with reference to FIG. 10.

An arrangement of line counters 68 and character counters 69 is associated with the timing and control section to keep track of the cursor position, so that when this position is reached during each refresh cycle this fact is recognized to permit the desired editing operation to be performed at this time.

The output of the refresh memory 23 is connected to the input of the character generator 30 through an output multiplexer 420. The character generator itself includes address gating 421, a timing and control section 422, a read-only memory 423 and a shift register 424.

A master oscillator 425 controls the timing of actions in the tape reader and keyboard interface 22, the normal recirculation rate in the refresh memory 23, the timing of the actions controlled by the timing and control section 24, and the operation of the timing and control section 422 in the character generator 30. A clock control 426 and various clock drivers 427 are driven by the timing and control logic to provide various clock signals which control recirculation of the refresh memory 23.

The first step in conditioning the editing system for operation is to enter into the refresh memory 23 three special codes, the "start-of-memory" (SOM) code, the "end-of-display" (EOD) code, and the cursor code. These special codes are inserted automatically as soon as the system is turned on. Following this, blank space codes are inserted into the refresh memory until it is completely filled. The three special codes identify the start of the memory, and when they are detected by the timing and control logic 24 the latter operates the deflection circuits 32 to move the cathode ray beam to the starting position, near the upper left corner of the screen of cathode ray tube 28. Since at this time all of the data entries in the refresh memory 23 which follow these three special codes are blanks, the cathode ray beam will remain blanked throughout its successive raster scans until it has traversed the entire display area of the screen.

SYNCHRONIZATION TO POWER SUPPLY

The next step is to synchronize the recirculation rate of the recirculating memory 26 and the scanning rate of the cathode ray tube 28 to the 60 cycle per second power supply, so as to prevent any noticeable flicker of the cathode ray tube display. When the SOD and line counters compare (block 173, FIG. 2), a 60 cycle detect circuit in the timing and control logic 24 (shown separately at block 35 in FIG. 2) looks for a pulse which is generated at the beginning of each cycle of the power supply. Such a pulse must occur sometime within a period of about 16.7 milliseconds after the SOD and line counters compare. The timing and control logic 24 stops the recirculation in the recirculating memory 26 for approximately 1 millisecond at a time, waiting for the 60 cycle sync pulse to appear. The recirculating memory has a minimum recirculation rate of about 1000 character positions per second. If recirculated at a slower rate, it will lose data that has been entered in.

Therefore, in effect, the timing and control logic 24 slows the memory recirculation rate from its normal rate of about 168,000 character positions per second down to 1000 character positions per second until the 60 cycle sync pulse occurs (which must be within 16.7 milliseconds after the SOD and line counters compare). During this waiting period the timing and control logic 24 also slows down the character-generating rate of the cathode ray beam (via the deflection circuits 32) to 1000 characters per second, so that the beam scanning rate is compatible with the character recirculation rate in the recirculating memory 26.

During this initial phase of operation, except for the three special character codes at the beginning, all of the "characters" in the refresh memory 23 are blanks, so that the screen of the cathode ray tube is dark except for the cursor.

When the 60 cycle sync pulse occurs during a particular 1 millisecond interval while the recirculating memory 26 is slowed down by the timing and control logic 24, this will be detected by the detect circuitry 35 associated with the timing and control logic 24. The latter then causes the recirculating memory 26 to resume recirculating at its normal rate and causes the beam deflection circuitry 32 for the cathode ray tube 28 to resume its normal scanning rate, compatible with the normal memory recirculation rate.

At the second line and each subsequent line of characters to be traced on the screen of the cathode ray tube, the circulation of the recirculating memory 26 must be stopped briefly for a predetermined period of time to allow for the retrace of the beam from the end of the preceding line to the beginning of this line. However, this delay interval is only a fraction of a millisecond. This delay is imposed on the recirculating memory 26 by the timing and control logic 24 in response to the detection of a special end of line (S*) code at the output of the recirculating memory 26. After this S* code is detected, the timing and control logic 24 stops the recirculating memory 26 for a predetermined interval equal to the time required for the beam to retrace to the beginning of the next line.

After all of the lines of characters have been traced on the screen of the cathode ray tube, the beam must retrace from near the lower right corner of the screen back up to the starting location near the upper left corner. During this retrace interval the timing and control logic 24 again interrupts the circulation in the recirculating memory 26.

The output of the recirculating memory 26 is connected through the timing and control logic 24 to a character counter 36 (FIG. 2), which receives from the recirculating memory an input pulse for each character position read out of the memory (blank space codes at this time). The character counter re-cycles after a predetermined number of such pulses, corresponding to the number of successive character positions which take up a horizontal line on the screen of the cathode ray tube.

A line counter arrangement, designated generally at 68 in FIG. 2, counts the number of times that the character counter re-cycles at this time. This line counter arrangement re-cycles after it has counted a predetermined number of lines and when it does so it provides a control signal to the timing and control logic 24 which then causes the cathode ray beam to retrace up to its starting position at the upper left corner and also stops the recirculating memory during such retrace of the beam.

After this beam retrace is completed and the SOD line counters compare, the timing and control logic 24 slows down the circulation rate of the recirculating memory 26 to about 1000 characters per second and similarly slows down the scanning rate of the cathode ray beam until synchronization with the 60 c.p.s. power supply is again established.

TAPE INPUT INTO REFRESH MEMORY

With the synchronization to the power supply now established and with the refresh memory filled with blank space codes, data read by the tape reader may now be entered into memory to replace these blank space codes.

As already mentioned, the special cursor code appears ahead of all the blank space codes in the refresh memory. This cursor code generates a distinctive marker, such as an arrowhead or cross-hairs, on the screen of the cathode ray tube. This marker ("cursor") now appears just below the first character position, at the upper left corner of the screen of the cathode ray tube. The position designated by the cursor determines where the next change may be made in the display on this screen. When the encoded text on the input tape is to be written into the refresh memory 23 and displayed on the screen, the operation is carried out in accordance with the "OVERSTRIKE CHARACTER" mode described in detail hereinafter. Using this mode, one character at a time read in from the input tape replaces a blank code in the refresh memory and on the screen.

The console operator actuates a key in the keyboard apparatus to begin the tape input into memory. The tape reader 20 reads serially from the input tape individual 6-bit codes, which may be character codes or special codes. In the interface 22, some of the special 6-bit codes are deleted and all of the 6-bit character codes and the undeleted special codes are converted into 8-bit codes before going into the refresh memory 23, all as described in detail in the concurrently-filed, copending application of Thomas P. Conroy, Walter G. Fredrickson and Howard A. Thrailkill, Ser. No. 37,192, assigned to the same assignee as the present invention.

Each time the interface 22 has completed the conversion of a 6-bit code from the input tape into the corresponding 8-bit code, it signals the timing and control logic 24 that an 8-bit code is ready to be enabled into the character address in the random access memory 27 where the cursor code is now stored. This 8-bit code now is written into this character address by a "character overstrike" operation, as described hereinafter. This 8-bit code replaces the cursor code in the random access memory and the cursor code is transferred over into the next following address location in the random access memory, replacing the blank code previously stored there. On the screen, the character defined by the newly-entered 8-bit code appears at the position formerly identified by the cursor, and the cursor itself now appears at the next position to the right.

Similar "character overstrike" operations are repeated in succession, one character at a time, until the original blank codes in the refresh memory have been replaced by character codes and other codes read in from the input tape, so that the text on the tape now is displayed on the screen of the cathode ray tube.

The tape reader 20 reads at a speed of about 180 characters per second, so that at least two and sometimes three characters are written into the refresh memory and entered onto the screen of the cathode ray tube during each 1/60 second refresh cycle of the cathode ray tube.

MASTER TIMING DIAGRAM—FIG. 11

Figure 11:
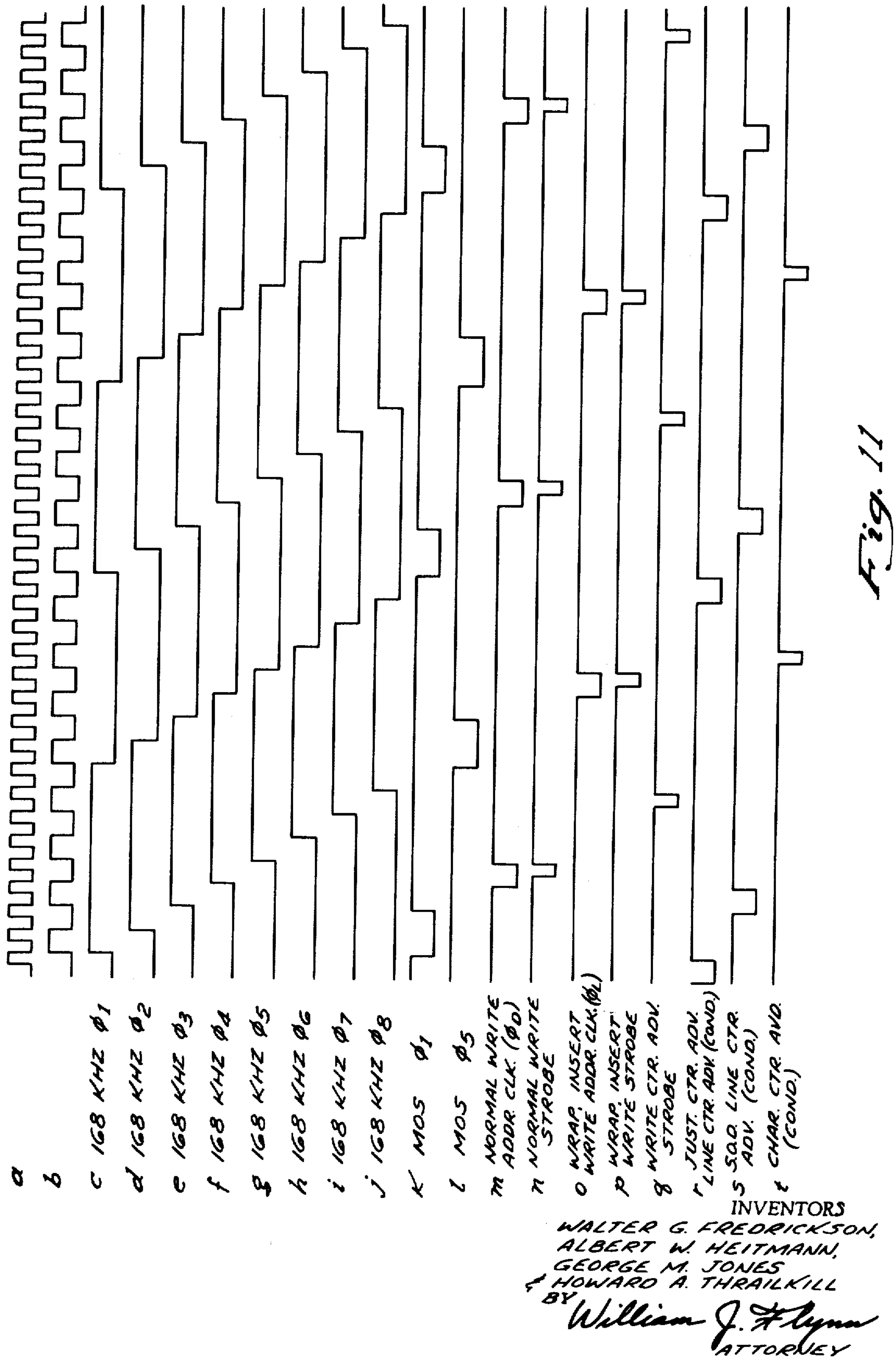
FIG. 11 is a master timing diagram showing the principal timing signals in the present system.

The master oscillator 425 in FIG. 2 produces a square wave output, as shown at line *a* of FIG. 11, which is fed into a divide-by-16 Johnson counter having eight series-connected flip-flops which provide the phase displaced square wave clock signals shown at lines *c* through *j* of FIG. 11. Each of these signals, $\phi 1$ through $\phi 8$, has a period of about 6 microseconds.

The MOS $\phi 1$ signal on line *k* is produced by combining the outputs of the first and fifth flip-flops in this counter through logic circuitry such that MOS $\phi 1$ is low when $\phi 1$ (line *c*) is high and $\phi 5$ (line *g*) is low. When MOS $\phi 1$ is high an 8-bit code, which may be a graphic character code or a non-character special code, appears at the output of the shift register 26.

The MOS $\phi 5$ signal on line *l* is produced by combining the outputs of the first and fifth flip-flops in the Johnson counter through logic circuitry such that MOS $\phi 5$ is low when $\phi 1$ (line *c*) is low and $\phi 5$ (line *g*) is high. When MOS $\phi 5$ is high the shift register 26 is conditioned to accept data into its input.

Thus, it will be evident that the circulation of data into and out of the shift register 26 is controlled by the MOS $\phi 1$ and MOS $\phi 5$ clocks so that every 6 microseconds one 8-bit code is read out of the shift register and another 8-bit code is written into the shift register.

The $\phi$D normal write address clock (line *m* of FIG. 11) is produced by combining the fourth and fifth flip-flops in the Johnson counter such that $\phi$D is low when $\phi 4$ is high and $\phi 5$ is low. This $\phi$D clock controls the addressing of data into the random access memory 27 by the write address register 93, as explained hereinafter. By comparing lines *k* and *m* it will be apparent the $\phi$D clock occurs shortly after MOS $\phi 1$ in each six microsecond interval.

The normal write strobe pulse (line *n*), which writes data from the output of the shift register 26 into the random access memory at the address determined by the write address register 93, occurs during the second half of the $\phi$D normal write address clock (line *m*).

The $\phi$L wrap insert write address clock (line *o*) is produced by combining the outputs of the fourth and fifth flip-flops in the Johnson counter such that $\phi$L is low when $\phi 4$ is low and $\phi 5$ is high. The $\phi$L clock controls the addressing of an end-of-line code into the random access memory by the wrap-write address register 61 when the last word in a line runs past the end of the line, as explained in detail in the section which follows, entitled "FULL WORD WRAP-AROUND."

The wrap insert write strobe pulse (line *p*), which writes the end-of-line code into the random access memory 27 at the address determined by the wrap-write address register 61, occurs during the second half of the $\phi$L wrap insert write address clock.

The write counter advance strobe (line *q* of FIG. 11), which toggles the write address register 93 to count up by one, occurs after the MOS $\phi 1$ clock and before the MOS $\phi 5$ in each 6-microsecond cycle.

Lines *r*, *s* and *t* show the timing signals which advance various counters in the counter arrangement 69 (FIG. 2) which keeps track of the cursor position.

ADDRESSING RANDOM ACCESS MEMORY

FIG. 10 shows in detail a write address register 93 and a read address register 200 through which the random access memory 27 may be accessed via the address multiplexer 67. Multiplexer 67 has five output terminals, designated $2^0$, $2^1$, $2^2$, $2^3$ and $2^4$, respectively, which are connected to corresponding terminals of the random access memory 27 so that the latter's 32 address positions may be accessed individually, depending upon the combination of binary signals on these terminals.

The write address register has five serially-connected flip-flops 202, 203, 204, 205 and 206. The input or trigger terminal T of the first flip-flop 202 is connected to the output of an AND gate 207.

The term AND gate is used herein to designate a gate whose output is near ground potential if and only if all of its inputs have a positive potential. The term OR gate is used to designate a gate that is functionally identical to the AND gate just described, but whose application in the circuit is more easily understood when it is considered as having a positive output if and only if any one or more of its inputs is near ground potential (this being no different in actual performance than the AND gate). The term exclusive OR gate refers to a gate whose output is positive if and only if at least one but less than all of its inputs have a positive potential.

The AND gate 207 has a first input 209 which is normally at high potential. Terminal 209 is suitably connected to line 113 in FIG. 6 such that terminal 209 is at high potential except when the flip-flop 112 in FIG. 6 has been operated, in which case terminal 209 would be grounded. As explained hereinafter, flip-flop 112 is operated during a "delete" operation or a "punch" operation.

A second input terminal of the AND gate 207 is connected to the output of an OR gate 210, which has two inputs 208 and 211. Terminal 211 is connected to receive a clock signal which coincides with the phase 1 clock shown at line *c* of FIG. 11, except during a retrace of the cathode ray beam. This clock signal on terminal 211 has a frequency of 168 kilocycles per second. During the normal writing in of data from the output of the shift register 26 into the random access memory 27, this clock signal on terminal 211 normally enables the AND gate 207 once during each 6 microseconds.

The second input terminal 208 of the OR gate 210 normally is at high potential so that it does not enable the OR gate. Terminal 208 is suitably connected to the output of AND gate 238 in FIG. 4 so that terminal 208 is at high potential except during a "delete" operation.

Accordingly, when the system is operating in its normal recirculating mode, the AND gate 207 is enabled once each six microseconds, thereby operating the first flip-flop 202 in the write address register 93. Every two operations of flip-flop 202 produces a single operation of flip-flop 203, and so on in the series, so that the register 93 has $2^5$ or 32 possible states.

The flip-flop 202 has its preset terminal P connected to the output of an AND gate 212*a* which has one input connected to terminal 212 and a second input 212*b* connected to receive a phase D clock signal (line *m* of FIG. 11). Terminal 212 receives a positive signal when the start-of-memory (SOM) code appears at the output of the shift register 26 and is detected by the special character decoder 37. The output of AND gate 212*a* also is connected through an inverter 213 to one input to an AND gate 214, whose other input is open-circuited and is normally at a high potential. The output of this AND gate is connected to the reset or clear terminal C of each of the remaining flip-flops 203, 204, 205 and 206 in the write address register. With this arrangement, the appearance of the SOM code in conjunction with the phase D signal causes flip-flop 202 to be preset to its "1" output state and causes flip-flops 203–206 to be reset to the "zero" output state, so that register 93 will have a count of 1.

The Q output terminal of flip-flop 202 is connected to one input of an AND gate 215, whose output is connected to the $2^0$ terminal. AND gate 215 has a second input from line 216, which is connected to the output of an OR gate 240. OR gate 240 has one input from the output of an AND gate 241. AND gate 241 has a first input from the aforementioned terminal 211, which receives a square wave clock signal. AND gate 241 has a second input which receives the phase D clock signal (line *m* of FIG. 11). Accordingly, during a portion of each 6 microsecond cycle, the AND gate 241 is enabled and a high potential appears on line 216 at the same time that a high potential may or may not appear on the other input to AND gate 215, depending upon the binary condition of the first flip-flop 202 in the write address register 93.

Similarly, the Q output terminals of the remaining flip-flops 203–206 in the write address register are each connected to one input of a corresponding AND gate 217, 218, 219 or 220, whose output is connected to a respective $2^1$, $2^2$, $2^3$ or $2^4$ terminal. Each AND gate 217, 218, 219 and 220 has a second input connected to line 216.

While the write address register 93 is normally enabled into the random access memory 27 by the operation of AND gate 241, the write address register may also be enabled into the random access memory by the operation of another AND gate 242, whose output is connected to a second input of the OR gate 240. This AND gate 242 has a first input which receives a phase 4 square wave clock signal (line *f* of FIG. 11) at a predetermined time during each six microsecond cycle. A second input to AND gate 242 is connected to terminal 87 in FIG. 4 to receive a high potential signal during an "insert character" operation.

Figure 5:
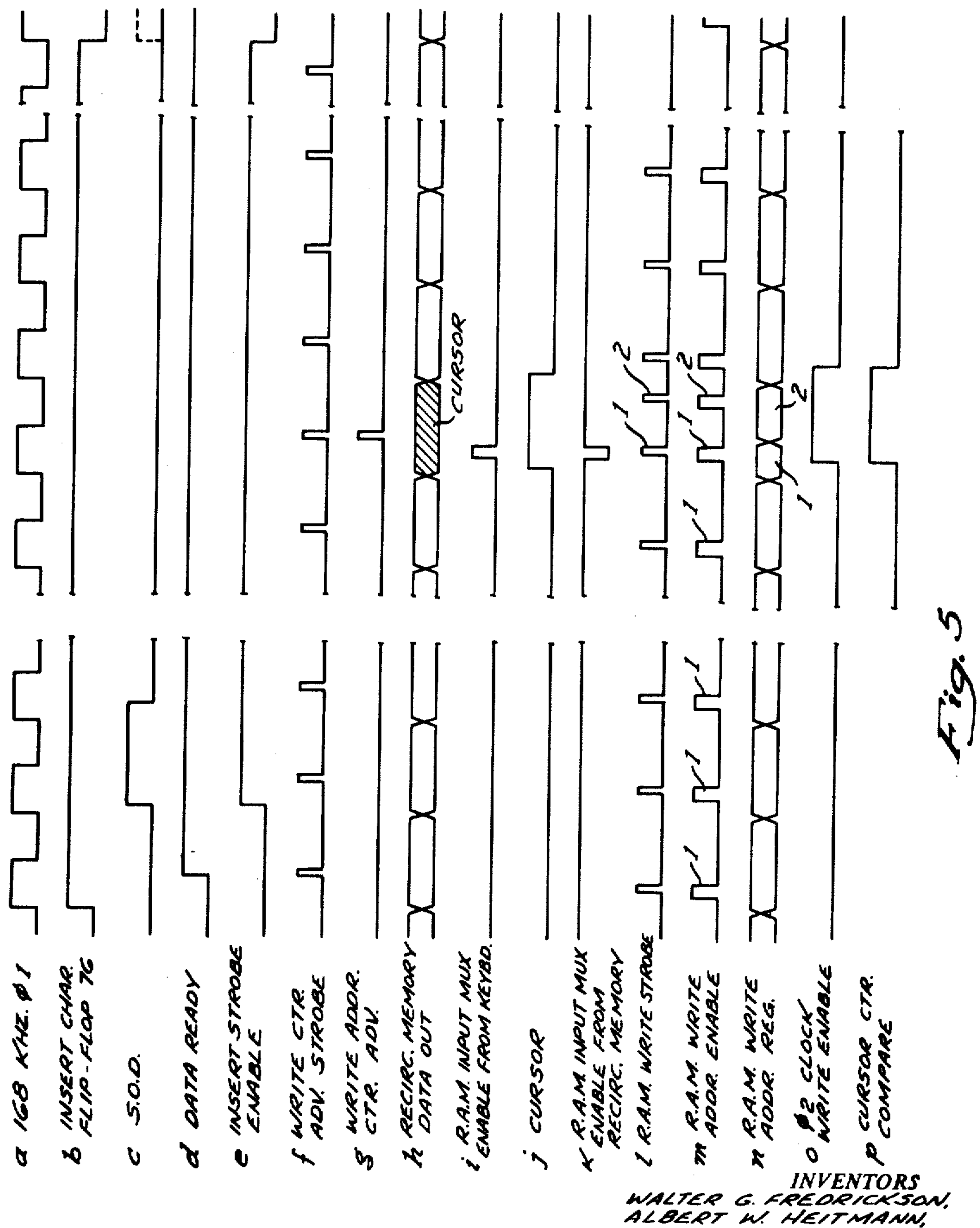
FIG. 5 is a timing diagram for the "insert character" mode of operation.

Referring to FIG. 5, during an "insert character" operation the square wave 1 on line *m* occurs when AND gate 241 is enabled, whereas the following square wave 2 on line *m* (which occurs later in the same 6 microsecond cycle of operation) occurs when AND gate 242 is enabled.

The read address register 200 has five serially-connected flip-flops 221, 222, 223, 224 and 225. The input or trigger terminal T of the first flip-flop 221 is connected to the output of an AND gate 226. One input to this AND gate is connected through an inverter 198 to terminal 211. A second input to AND gate 226 is connected to the output terminal 228 of a flip-flop provided by two cross-connected OR gates 229 and 230. OR gate 230 has one input connected to the output of AND gate 212*a*, so that flip-flop 229, 230 is reset when the SOM code appears at the output of the shift register 226.

Terminal 212 also is connected, via the AND gate 212*a*, to the reset or clear terminal C of each of the flip-flops 221–225 in the read address register 200, so that this register will be reset to a count of zero in response to the appearance of the SOM code at the output of the recirculating memory 26, along with the occurrence of the phase D signal.

One input of the OR gate 229 is connected to the output of an AND gate 231 having six inputs. One of these inputs is connected to the output of AND gate 207; a second is connected to the $\overline{Q}$ output terminal of the first flip-flop 202 in the write address register 93; the remaining four inputs are connected to the Q output terminals of flip-flops 203–206 in the write address register. With this arrangement the AND gate 231 will be enabled in response to the 31st enabling of the AND gate 207, thereby operating the flip-flop 229, 230 to enable the AND gate 226.

Such enabling of the AND gate 226 causes the read address register 200 to begin counting up from the count (zero) to which it was reset by the appearance of the last SOM code. Consequently, the read address register 200 is now 30 counts behind the write address register 93, and this 30 count separation between these two registers will be maintained as long as no editing operation is being performed which would change it.

As already explained, an "insert character" operation would increase by one the count in the write address register, so that the count separation between the write and read address registers would become 31 (or 1 in the opposite direction). Also, as explained, a "delete character" or other delete operation would hold back the normal counting operation of the write address register so that the count separation between the write and read address registers would become less than 30. However, in any of these modes of operation, at the beginning of the next display or refresh cycle of the cathode ray tube 28 the appearance of the start-of-memory code would reset the write address register 93 to one and the read address register 200 to zero, and the normal 30 count separation between them would be resumed until changed by one of the aforementioned editing functions.

In the read address register the Q output terminal of flip-flop 221 is connected to one input of an AND gate 232, whose output is connected to the $2^0$ terminal. AND gate 232 has a second input which is connected to a terminal 233. Similarly, the Q output terminals of flip-flops 222–225 are each connected to one input of a corresponding AND gate 234, 235, 236 or 237, whose output is connected to a respective terminal $2^1$, $2^2$, $2^3$, or $2^4$. Each AND gate 234, 235, 236 or 237 has a second input connected to terminal 233.

Terminal 233 is at high potential except when the write address register 93 or the address-of-last-space register 61 (FIG. 3) is being enabled into the random access memory 27. Accordingly, for most of each six microsecond cycle of operation, the read address register 200 is enabled into the random access memory. Suitable logic circuitry (not shown) is provided for causing terminal 233 to become grounded when either the write address register 93 or the address-of-last-space register is being enabled into the random access memory.

It will be understood that it is necessary to enable the read address register 200 into the random access memory 27 only during the phase 2 interval (line *d* of FIG. 11) of the master clock because that is when the shift register 26 is ready to receive input data.

The AND gate 215 and 232, whose outputs are both connected to the $2^0$ terminal, are both open-collector AND gates provided with an external resistor so that together they form a wired OR gate. If the output of either AND gate 215 or 232 becomes grounded it causes the output of the other to become grounded also.

The same is true of the AND gates 217 and 232 which are connected to the $2^1$ terminal, the AND gates 218 and 235 which are connected to the $2^2$ terminal, the AND gates 219 and 236, which are connected to the $2^3$ terminal, and the AND gates 220 and 237 which are connected to the $2^4$ terminal.

FIG. 10 also includes circuitry for comparing, bit for bit, the respective counts in the write and read address registers 93 and 200 to provide a halt indication to the timing and control logic whenever the counts in these registers are the same, at which time the timing and control logic should discontinue any editing operations for the remainder of that refresh cycle.

This circuitry includes an AND gate 250 having six inputs. A first input to this AND gate is from the output of an exclusive OR gate 251. Gate 251 has two inputs which are connected to the Q output terminals of the first flip-flops 202 and 221 in the write and read address registers 93 and 200, respectively.

A second input to the AND gate 250 is from the output of an exclusive OR gate 252 through an inverter 253. Gate 252 has two inputs which are connected to the Q output terminals of the second flip-flops 203 and 222 in the respective registers.

A third input to the AND gate 250 is from the output of an exclusive OR gate 254 through an inverter 255. Gate 254 has two inputs which are connected to the Q output terminals of the third flip-flops 204 and 223 in the write and read registers, respectively.

A fourth input to the AND gate 250 is from the output of an exclusive OR gate 256 through an inverter 257. Gate 256 has two inputs which are connected to the Q output terminals of the fourth flip-flops 205 and 224 in the respective registers.

A fifth input to the AND gate 250 is from the output of an exclusive OR gate 258 through an inverter 259. Gate 258 has two inputs which are connected respectively to the Q output terminals of the fifth flip-flops 206 and 225 in the write and read registers.

The sixth input to the AND gate 250 is from the output of the AND gate 226.

With this arrangement the AND gate 250 is enabled only if there is a bit-by-bit match between the write and read address registers 93 and 200, in which case the editing operation is halted until the next appearance of the SOM code at the output of the recirculating memory 26 reestablishes the normal 30 count separation between the write and read address registers.

RAM INPUT MULTIPLEXER

Figure 12:
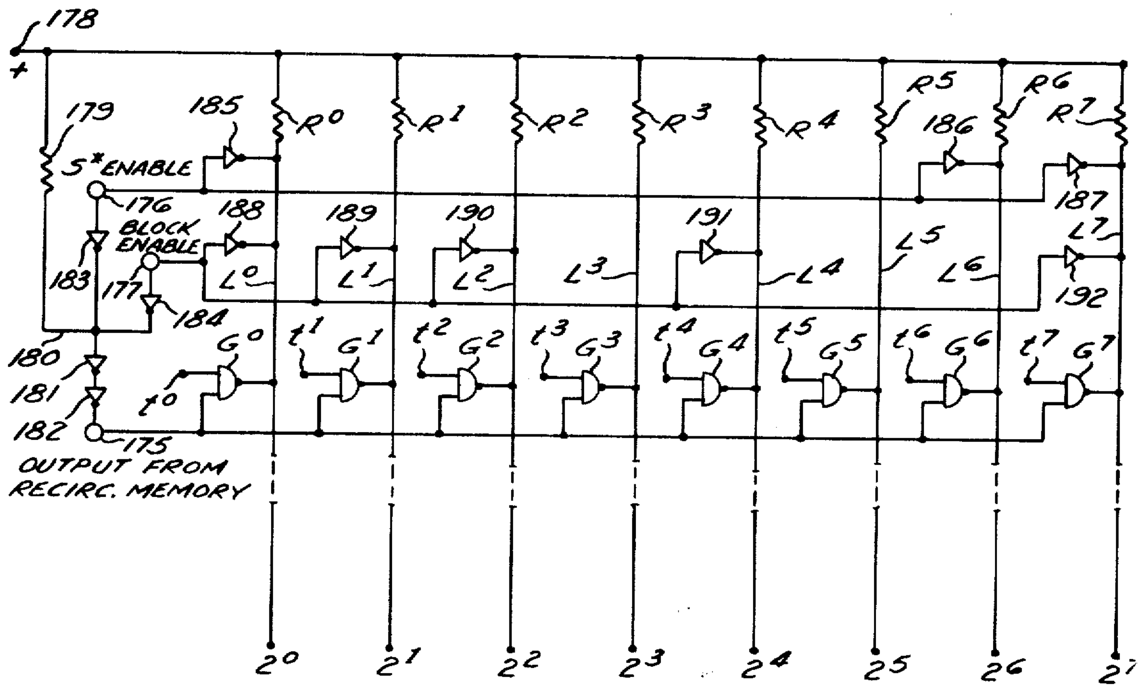
FIG. 12 is a schematic view illustrating a portion of the input multiplexer for the random access memory in the present apparatus.

FIG. 12 illustrates enough of the circuitry in the input multiplexer 46 for the random access memory 27 to indicate the manner in which the data output from the recirculating memory 26 is disabled from entering the data input of random access memory whenever it is desired to write any of several special codes into the random access memory. That is, any one of these special codes takes precedence over the normal data output from the recirculating memory into the random access memory. FIG. 12 shows the input enable terminals for just two such special codes, the S* (end-of-line) code and the block code which is to be entered whenever a "define block" operation is to be performed, as explained in detail hereinafter. However, it is to be understood that there are several other special inputs (not shown) any of which can disable the recirculating memory data output from entry into the random access memory in a manner similar to that now to be described.

Figure 3:
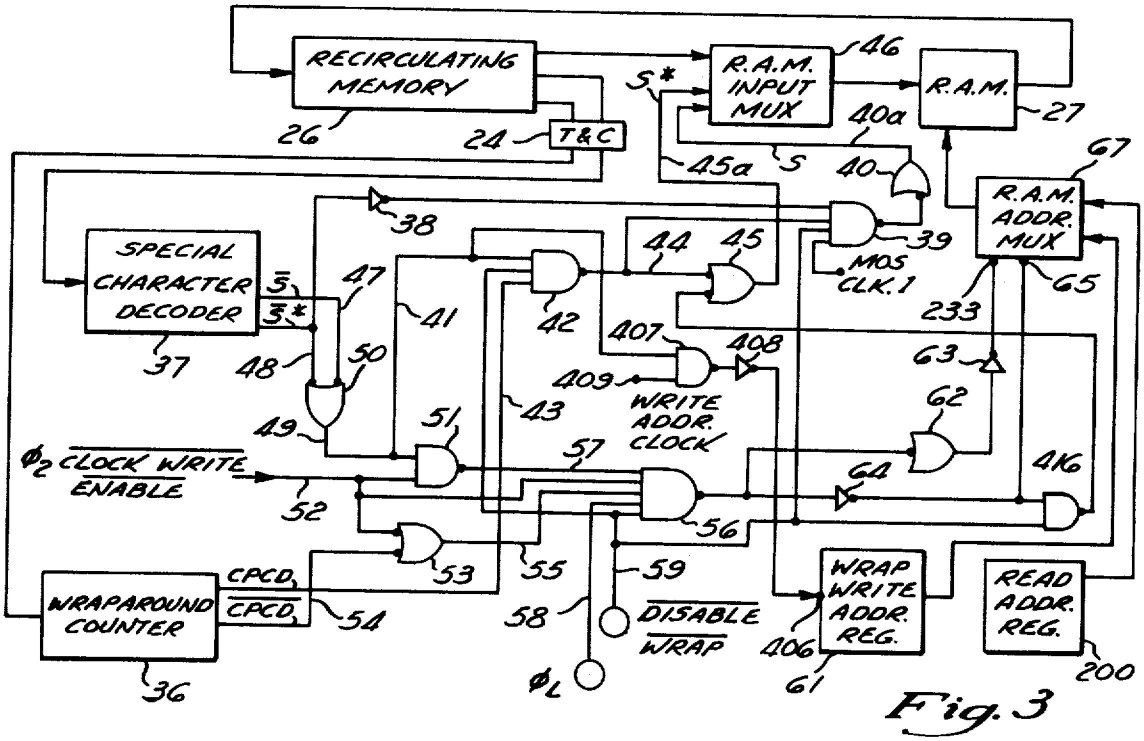
FIG. 3 illustrates schematically the circuitry in the present apparatus for ending each line of the displayed text just before a word which would run beyond the end of that line.

Referring to FIG. 12, the input multiplexer has a plurality of input enable terminals, three of which are shown here, namely the terminal 175 for enabling the data output of the recirculating memory 26, terminal 176, which is connected to receive the S* enable signal into the random access memory from line 45a in FIG. 3, and terminal 177, which receives a block enable signal when the "define block" operational mode is established.

The recirculating memory enable terminal 175 is connected to one input of each of a group of AND gates, $G^0$, $G^1$, $G^2$, $G^3$, $G^4$, $G^5$, $G^6$, and $G^7$. The output terminals of these AND gates are connected directly to respective lines $L^0$, $L^1$, $L^2$, $L^3$, $L^4$, $L^5$, $L^6$ and $L^7$, which are connected to the data input terminals of random access memory 27 for the $2^0$, $2^1$, $2^2$, $2^3$, $2^4$, $2^5$, $2^6$, and $2^7$ data bits, respectively. A power supply terminal 178 is connected to these lines through respective resistors $R^0$, $R^1$, $R^2$, $R^3$, $R^4$, $R^5$, $R^6$ and $R^7$. The AND gates $G^0$–$G^7$ have respective second input terminals $t^0$–$t^7$, each of which receives from the output of the recirculating memory 26 a signal corresponding to the binary value of the data bit which corresponds to that AND gate. For example, when the third data bit (i.e., the $2^2$ bit) in the 8-bit coded signal at the recirculating memory output is binary 1, a positive signal will be applied to input terminal $t^2$ for AND gate $G^2$, so that this AND gate will be enabled if the signal on terminal 175 also is positive.

However, terminal 175 is grounded if an enable signal is present at either of the other enable input terminals 176, 177 shown in FIG. 12. The power supply terminal 178 is connected to the recirculating memory enable terminal 175 through a resistor 179, line 180, and a pair of series-connected inverters 181 and 182. The S* enable terminal 176 is connected to line 180 through an inverter 183 which is an open-collector transistor. The block enable terminal 177 is connected to line 180 through an open-collector transistor inverter 184. In the absence of a positive signal at either terminal 176 or 177, line 180 will be at substantially the positive potential of power supply terminal 178 and therefore terminal 175 will also be positive. However, a positive signal on either terminal 176 or 177 will be inverted by the respective inverter 183 or 184 to ground line 180, thereby causing terminal 175 to be grounded. As a result, none of the AND gates $G^0$–$G^7$ can be enabled in response to the corresponding data bits appearing at the output of the recirculating memory 26.

The S* enable terminal 176 is connected to lines $L^0$, $L^6$ and $L^7$ through respective inverters 185, 186 and 187, so that these lines will be grounded in response to the S* enable signal, while lines $L^1$, $L^2$, $L^3$, $L^4$ and $L^5$ will be positive. This particular combination of inputs to the data terminals $2^0$–$2^7$ corresponds to the 8-bit code for S* in the present system.

The block enable terminal 177 is connected to lines $L^0$, $L^1$, $L^2$, $L^4$ and $L^7$ through respective inverters 188, 189, 190, 191 and 192, so that the binary signal values appearing on terminals $2^0$–$2^7$ will correspond to the 8-bit "block" code when the block enable signal is present at terminal 177.

It will be understood that various other enable inputs (not shown) are connected to lines $L^0$–$L^7$ and to line 180 in the same manner, so that whenever any of these inputs receives a positive enable signal it will:

(1) disable the recirculating memory output from the data input of the random access memory 27; and (2) enable a corresponding special code into the random access memory.

INSERT CHARACTER MODE

Figure 4:
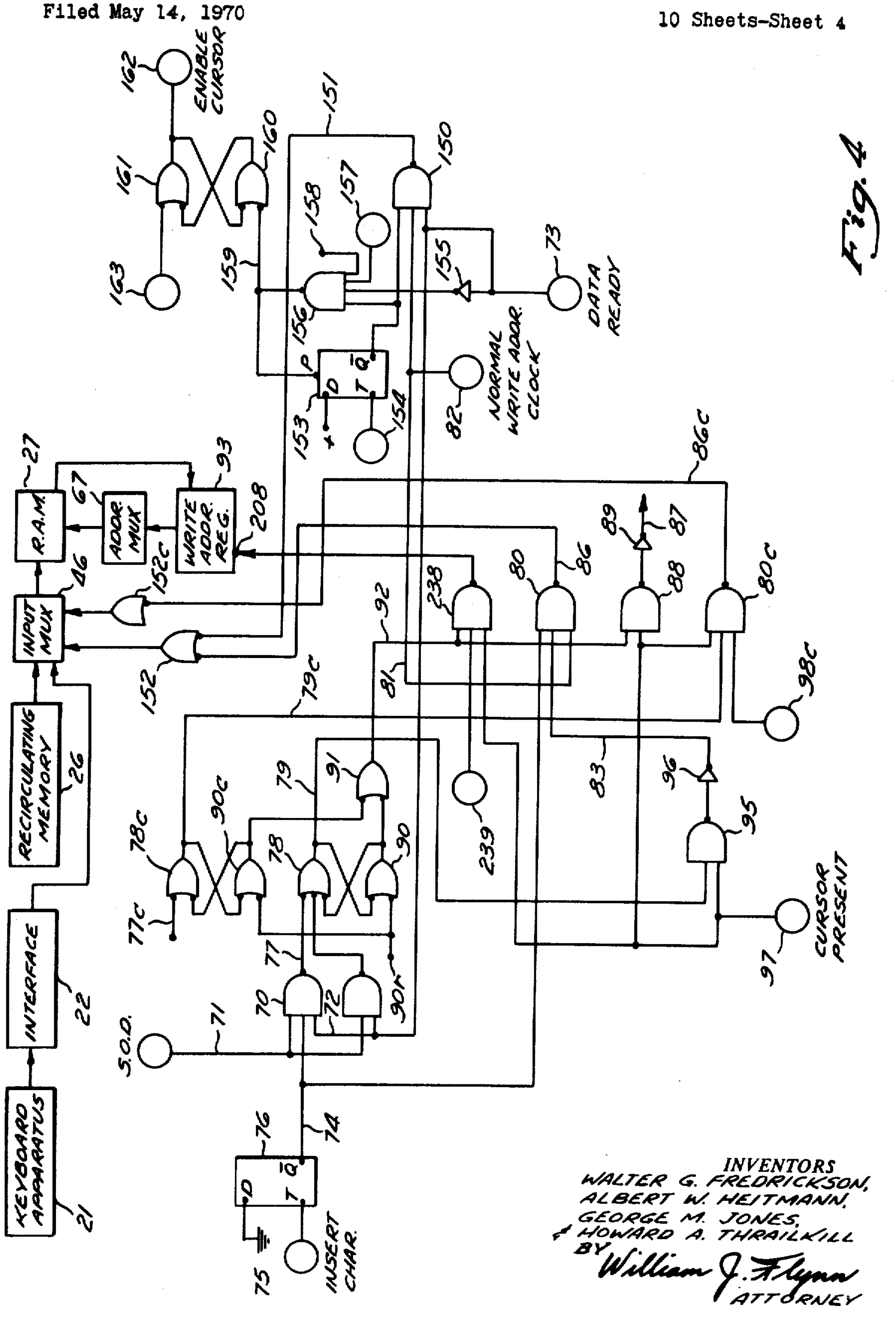
FIG. 4 illustrates schematically the circuitry in the present apparatus for inserting a character ,or inserting a cursor, or overstriking a character at any selected point in the displayed text which is being edited or corrected.

FIG. 4 illustrates logic circuitry in the timing and control section 24 which operates when a character is being inserted from the keyboard apparatus 21 into a selected location in a selected line of the text appearing on the screen of the cathode ray tube 28. FIG. 5 illustrates the timing diagrams for this mode of operation of the present apparatus.

Referring to FIG. 4, the "insert character" operation is controlled by an AND gate 70 which is enabled when the following three conditions occur:

(1) The start-of-display (SOD) counter comparison appears at the output of the SOD counter comparator 173, causing a positive signal to appear on input line 71 to the AND gate 70. SOD is detected by the SOD counter comparator to provide this positive signal.

(2) A "data ready" positive signal appears on a second input line 72 to the AND gate 70. This signal is applied to terminal 73 in FIG. 4 from the tape reader and keyboard interface 22 (FIG. 1) whenever any character key in the keyboard apparatus is struck.

(3) A positive signal appears on the third input line 74 to the AND gate 70. This occurs in response to the actuation of an "insert character" key in the keyboard apparatus 21 which, through the interface 22, produces a signal at terminal 75 in FIG. 4 that operates flip-flop 76 to produce a positive signal on line 74.

Thus, regardless of when, in a refresh cycle of the recirculating memory 26 and the cathode ray tube 28, the insert character key and the key for the character to be inserted are depressed, the insert character operation cannot begin until the beginning of the next cycle of operation, when SOD appears, as shown at line *c* of FIG. 5.

When all three of the foregoing conditions are satisfied the AND gate 70 delivers an "insert strobe enable" signal to its output line 77. This signal enables an OR gate 78 to provide a positive output signal on line 79. This "insert stroke enable" signal is shown at line *e* of FIG. 5. OR gate 78 is cross-coupled to another OR gate 90 to constitute a flip-flop.

The "insert strobe enable" line 79 is connected to one input terminal of an AND gate 95. A second input, at terminal 97, to AND gate 95 receives a true signal when various counters which keep track of the position of the cursor indicate that the cursor is now present at the output of the recirculating memory 26. The output of AND gate 95 is connected through an inverter 96 and line 83 to one input terminal of an AND gate 80.

The AND gate 80 has a second input which is connected to the $\overline{Q}$ output line 74 from the insert character flip-flop 76. Consequently, when the insert character signal appears, it causes a positive signal to be applied to this second input of AND gate 80.

The AND gate 80 has a third input which is connected by line 81 to a normal write address clock input terminal 82, which receives a signal that is inverted from the signal shown at line *m* of FIG. 11, so that terminal 82 is positive for only a small fraction of each 6 microsecond clock cycle.

With this arrangement, after the "insert character" key in the keyboard apparatus 21 has been actuated and the insert character flip-flop 76 has been operated (line *b* of FIG. 5) and the "insert strobe enable" signal (line *e* of FIG. 5) has appeared on line 79, the AND gate 80 waits for the cursor to appear at the output of the recirculating memory 26. When the cursor does appear, as shown at line *j* of FIG. 5, the AND gate 95 is enabled, thereby providing a signal to enable AND gate 80 when the narrow positive normal write address clock pulse appears at terminal 82. AND gate 80 now provides on its output line 86 a signal which is applied through an OR gate 152 to the input multiplexer 46 of the random access memory 27 to enable the selected character from the keyboard apparatus 21 into the random access memory 27. This enable pulse is shown at line *i* of FIG. 5. It occurs about 1 microsecond after the beginning of the appearance of the cursor code at the output of the recirculating memory 26, as shown at line *j* of FIG. 5. The total interval of the appearance of the cursor (and each other data output from the recirculating memory) lasts about 6 microseconds, as determined by one cycle of the phase 1 clock (line *a* of FIG. 5).

It will be evident that when the cursor code appears at the output of the recirculating memory 26 this introduces the possibility of two different inputs to the random access memory: one, the cursor itself, and two, the character selected at the keyboard. The present apparatus causes these two entries to be made in a predetermined sequence during the 6-microsecond interval normally allotted to a single data entry into the random access memory.

As described in detail with reference to FIG. 12, the input multiplexer 46 has a second enable circuit which receives the data output from the recirculating memory 26 and which is normally enabled, but is disabled as long as there is any other enable input signal to the multiplexer. Thus, as shown in line *k* of FIG. 5, the recirculating memory input to the random access memory is disabled while the keyboard input (line *i*) is enabled. In the present situation, therefore, the cursor code appearing at the output of the recirculating memory 26 now cannot be written into the random access memory 27.

As described in detail with reference to FIG. 10, the write address register 93 for the random access memory 27 normally is toggled once each 6-microsecond cycle of the phase 1 clock, as shown at line *n* of FIG. 5. However, in the "insert character" mode now under consideration the write address register 93 is toggled twice during the 6-microsecond cycle when the cursor code is at the output of the recirculating memory 26. The first of these two times it is toggled, as shown at 1 in line *n* of FIG. 5, the character corresponding to the key which has been actuated in the keyboard apparatus 21 is written into the next address in the random access memory 27. The second of these times the write address register is toggled, as shown at 2 in line *n* of FIG. 5, the cursor code is written into the following address in the random access memory.

This second toggling of the write address register 93 occurs in response to an output signal from an AND gate 238 in FIG. 4, whose output terminal is connected to the write address register input terminal 208 in FIG. 10.

The AND gate 238 has a first input terminal connected to the previously-mentioned terminal 97 so as to receive an enabling signal when the cursor is present.

A second input to AND gate 238 is connected to terminal 239, which receives a "write counter advance strobe" timing pulse, as shown at line *f* of FIG. 5.

A third input to AND gate 238 is provided from the output of OR gate 90 in the "insert strobe enable" flip-flop 78, 90 through OR gate 91 and line 92. This third input receives an enable signal in response to the operation of this flip-flop. Consequently, when the next "write counter advance strobe" pulse occurs (line *f* of FIG. 5), the AND gate 238 is enable and it produces the "write address counter advance" pulse (line *g*) which is applied to the write address register 93 at its input terminal 208 to operate this register the second time during this 6-microsecond cycle of the phase 1 clock.

As already described in connection with FIG. 10, the write address register 93 normally is enabled into the random access memory 27 once each 6-microsecond cycle by the phase D clock, which enables AND gate 241. This normal enabling is indicated by the square wave pulses 1 in line *m* of FIG. 5.

Also, as already mentioned, in the "insert character" mode, during a 6-microsecond cycle the address register 93 is enabled a second time into the random access memory, as indicated by pulse 2 on line *m* of FIG. 5. This occurs in response to the enabling of an AND gate 88 in FIG. 4. The output of this AND gate is connected through an inverter 89 to line 87 which, as shown in FIG. 10, provides one input to AND gate 242. A second input to AND gate 242 is provided by the phase 4 clock pulse which, as shown in FIG. 11, occurs after the pase D clock pulse. When this phase 4 clock pulse occurs, the write address register 93 is enabled a second time into the random access memory.

The AND gate 88 has a first input connected to the previously-mentioned line 92 and a second input connected to the previously-mentioned terminal 97. Consequently, during the six-microsecond interval when the cursor is present at the output of the recirculating memory 26, following the operation of the "insert strobe enable flip flop 79, 90, the AND gate 88 will be enabled and, through the inverter 89, it provides on line 87 a phase 2 clock write enable signal, as shown at line *o* of FIG. 5.

The concurrence of enabling signals on line 87 and the phase 4 input operates the AND gate 242 in FIG. 10 to enable the write address register 93 into the random access memory 27 a second time in the 6-microsecond cycle when the cursor code is present at the output of the recirculating memory 26.

After the "insert character" operation has been completed, a signal appears at terminal **90*r* which resets the flip-flop 78, 90**.

INSERT CURSOR

The cursor may be inserted into the refresh memory 23, and therefore into the text display on the screen of the cathode ray tube 28, by an operation generally similar to the just-described "insert character" operation.

Referring to FIG. 4, a pair of cross-connected OR gates **78*c* and 90*c* constitute a flip-flop. One input 77*c* to this flip-flop receives an enabling signal when one of several possible "insert cursor" operations is to be performed, such as when moving the cursor from one line of text to the next line above or below. Such a cursor insertion operation is initiated from the keyboard apparatus 21. This signal on terminal 77*c* operates this flip-flop 78*c*, 90*c*, to produce a positive signal on line 79*c*, which provides one input to an AND gate 80*c***.

A second input to AND gate **80*c* is from terminal 98*c*, to which is applied a clock signal which occurs once each 6 microsecond cycle of the phase 1** signal shown at line *a* of FIG. 5.

A third input to AND gate **80*c* is from the "cursor present" terminal 97**.

With this arrangement, when all three inputs to AND gate **80*c* are positive, it provides an output signal on line 86*c* which is applied through an OR gate 152*c* to the input multiplexer 46** of the random access memory to enable the cursor code into the random access memory.

The operation of the flip-flop **78*c*, 90*c* also causes the AND gates 238 and 88 to be enabled, so that the write address register 93 is toggled a second time during a single six-microsecond cycle of the phase 1 clock, and the write address register 93 is enabled a second time into the random access memory. These actions take place in response to a ground signal appearing at the output of OR gate 90*c* of the flip-flop, which causes a positive signal to appear on the output line 92 from OR gate 91**.

After the "insert cursor" operation is completed, a signal appears at terminal **90*r* which resets the flip-flops 78*c*, 90*c***.

OVERSTRIKE CHARACTER

In this operational mode, a selected character in the text appearing on the cathode ray tube 28 is replaced by a character selected at the keyboard apparatus 21. On the cathode ray tube screen, the cursor is at the location of the displayed character which is to be deleted, and it immediately precedes this character in the recirculating memory 26. The sequence of operation in this mode includes the following steps:

(1) the cursor code is replaced in the refresh memory 23 by the selected keyboard character, and then
(2) the displayed character which is to be deleted is replaced in the fresh memory by the cursor code, so that now the cursor identifies the next character in the display and immediately precedes it in the recirculating memory.

Figure 9:
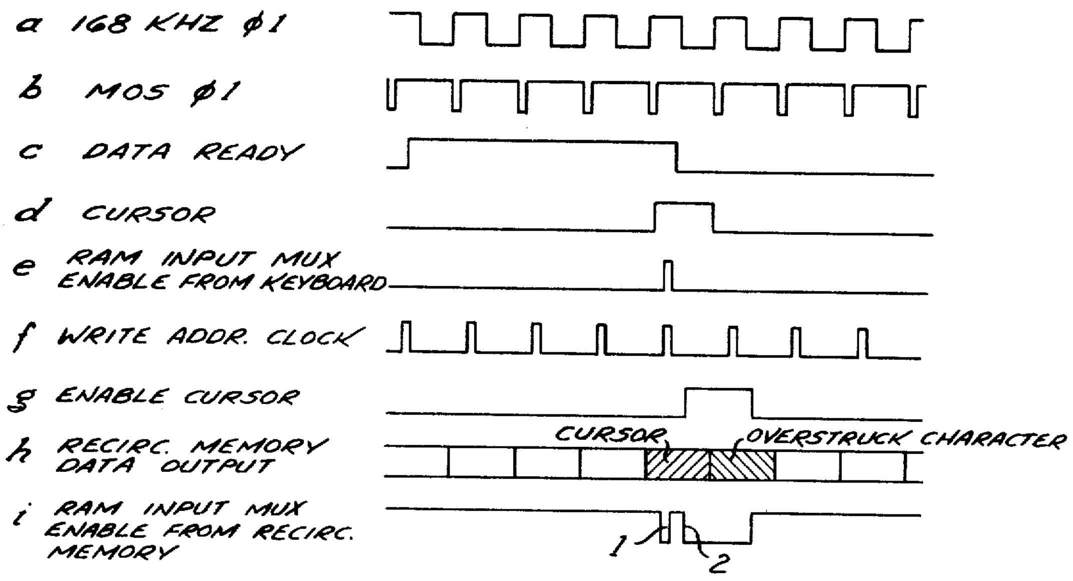
FIG. 9 is a timing diagram for the "overstrike character" mode of operation.

Referring to FIG. 4 and the timing diagram shown in FIG. 9, step (1) above is controlled by an AND gate 150 having its output connected by line 151 and OR gate 152 to the input multiplexer 46 for the random access memory 27. This AND gate 150 has a first input terminal connected to the normal write address clock input 82 to receive a clock signal, as shown at line *f* of FIG. 9, which is inverted from the phase D signal shown at line *m* of FIG. 11. A second input terminal of AND gate 150 is connected to the data ready input 73 (line *c* of FIG. 9). The third input terminal of AND gate 150 is connected to the $\overline{Q}$ output terminal of a flip-flop 153. The input terminal T of this flip-flop is normally at ground potential, and it receives a positive high potential from terminal 154 to operate the flip-flop when the cursor code appears at the output of the recirculating memory 26, as shown at line *d* of FIG. 9.

As already stated, this appearance of the cursor code lasts 6 microseconds (one full cycle of the master clock pulse source indicated at line *a* of FIG. 9). The data ready signal at terminal 73 appears after the operator of the keyboard apparatus 21 strikes the key for the character which is to be entered.

Consequently, after the data ready signal (line *c* of FIG. 9) has appeared and the cursor code (line *d*) has appeared, the next normal write address clock pulse (line *f*) causes the AND gate 150 to be enabled, producing an output signal on line 151 which enables OR gate 152, causing the input multiplexer 46 to apply to the data input of the random access memory 27 the character code for the selected character key in the keyboard apparatus 21, as shown by the pulse on line *e* of FIG. 9. At the same time, the output from the recirculating memory 26 is disabled from the data input of the random access memory 27, as shown by the first negative-going pulse 1 on line *i* of FIG. 9. Consequently, the cursor code appearing at the output of the recirculating memory 26 is prevented from being written into the random access memory 27, while the character code for the selected key is written into the random access memory 27 to replace the cursor code.

The data ready signal appearing at terminal 73 (line *c* of FIG. 9) is reset to ground in response to the negative-going trailing edge of the enable signal output from AND gate 150 (line *e* of FIG. 9). If desired, there may be a time delay between the reset of the data ready terminal 73 and the trailing edge of this enable signal.

This reset of the data ready signal at terminal 73 causes a signal to be applied via an inverter 155 to one input terminal of an AND gate 156. A second input terminal of this AND gate is connected to the $\overline{Q}$ output terminal of flip-flop 153, which is still positive. Additional inputs to this AND gate are provided by a clock pulse source 157 and a 1.5 mc. pulse source 158. With this arrangement, when the data ready signal at terminal 73 is reset, the AND gate 156 is enabled.

The output signal from AND gate 156 is applied via line 159 to one input to an OR gate 160 which is interconnected with a second OR gate 161 to provide a flip-flop which now provides a signal at terminal 162 which causes the input multiplexer 46 to enable the cursor code into the data input of the random access memory 26, as shown by the positive square wave signal on line *g* of FIG. 9. In so doing the input multiplexer 46 also disables the recirculating memory output from the data input of the random access memory, as shown by the second negative square wave 2 on line *i* of FIG. 9, so that the character code appearing at the output of the recirculating memory 26 during this 6-microsecond cycle of the master clock pulse source (line *a* of FIG. 9) is not written into the random access memory but instead is replaced by the cursor code.

The enabling of the AND gate 156 also causes the flip-flop 153 to be reset by the positive signal applied from the AND gate output to its P terminal.

The flip-flop 161, 162 is reset by a clock pulse applied to terminal 163 toward the end of each 6 microsecond cycle of the master clock pulse source.

DELETE CHARACTER

The delete character mode is initiated by depressing a "delete character" key in the keyboard apparatus 21, following which the circuitry now to be described causes a deletion from the refresh memory of the character disployed on the screen of the cathode ray tube 28 where the cursor is located.

Figure 6:
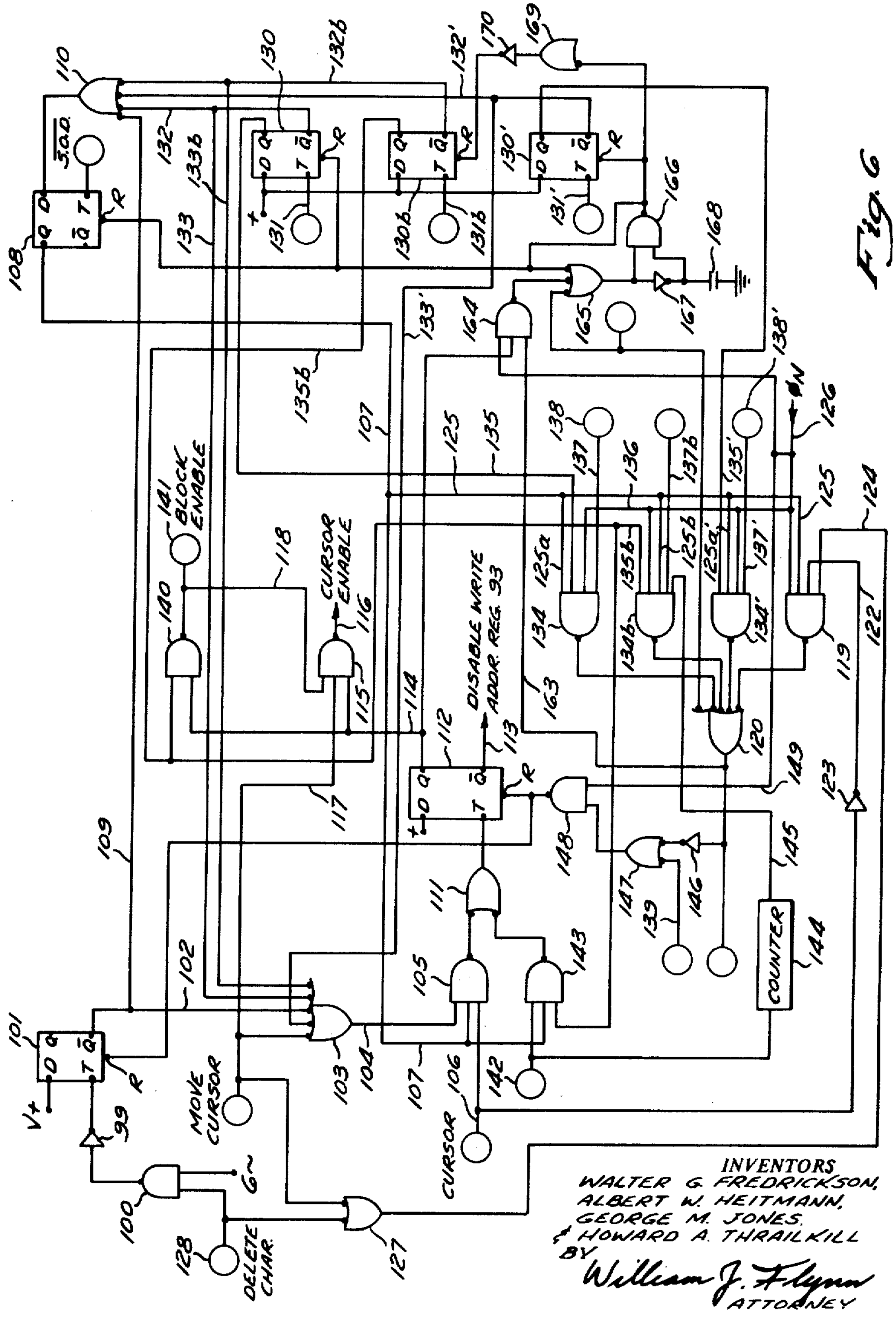
FIG. 6 illustrates schematically the circuitry in the present apparatus for performing various delete operations on the displayed text which is being edited or corrected.

Referring to FIG. 6, the logic circuitry for the delete character mode includes an AND gate 100 having a first input terminal connected to a 6 cycle per second pulse source and a second input terminal 128 connected to receive a signal when the "delete character" key is depressed. When these two inputs are both high (i.e., above ground) the output of the AND gate is low (i.e., ground), and an inverter 99 converts this output signal from the AND gate to a high input signal on the input terminal T of a flip-flop 101.

Normally (i.e., before this input signal occurs as a result of depressing the "delete character" key) the input terminal T of flip-flop 101 is grounded, its Q output terminal is at ground, and its $\overline{Q}$ output terminal is at the high potential of the D terminal. When the high input signal occurs, as described, terminal T goes high, the Q output terminal goes to the high potential of the D terminal, and $\overline{Q}$ output terminal goes to ground.

The line 102 connected to the $\overline{Q}$ output terminal passes this negative-going signal to an input to an OR gate 103 which now produces a high potential on its output line 104, which provides one input to an AND gate 105.

This AND gate has a second input on line 106, which is normally at ground potential until the cursor code appears at the output of the recirculating memory 26, at which time the potential on line 106 goes high.

A third input line 107 to the AND gate 105 is connected to the Q output terminal of a flip-flop 108.

The $\overline{Q}$ output terminal of flip-flop 101 is connected by a line 109 and an OR gate 110 to the D terminal of flip-flop 108. The T input terminal of flip-flop 108 is connected to an output terminal of the special character decoder 37 (FIG. 3) such that terminal T is at a high potential until the SOD counter comparison appears at the output of the counter comparator 173, at which time the potential at terminal T drops to ground.

A "master clear" signal applied to the reset terminal R of flip-flop 108 normally establishes the following conditions in flip-flop 108 before the SOD comparison appears and before the delete character key is struck: with the T input terminal high and the D terminal at ground, output terminal $\overline{Q}$ is high and output terminal Q is grounded.

When the "delete character" key is struck (and before the SOD comparison appears at the output of the counter comparator 173) terminal D goes high. Then, when SOD appears the input terminal T goes to ground for the one-half microsecond interval while SOD is present and then at the end of this interval it goes high again. The positive-going trailing edge of this start-of-display pulse operates the flip-flop 108, so that terminal Q goes high, so that now a high potential appears on line 107 at the third input to AND gate 105.

From the foregoing it will be understood that after the "delete character" key has been struck and SOD has appeared at the output of the counter comparator 173, when the cursor code next appears at the output of the recirculating memory all three inputs to the AND gate 105 will be positive. The output of AND gate 105 now goes from high positive down to ground and an OR gate 111 connected to this output now produces a high output signal which it applies to the input terminal T of a master delete flip-flop 112.

Normally (i.e., before receiving this input signal) flip-flop 112 has its $\overline{Q}$ output terminal at the high potential applied to its D terminal and its Q output terminal at ground potential. The high positive input signal applied to terminal T, as described, operates flip-flop 112 to cause its O output terminal to go high and its $\overline{Q}$ output terminal to go to ground.

The negative-going signal on line 113 connected to the $\overline{Q}$ output terminal of flip-flop 112 disables the write address register 93 (FIG. 2) for the random access memory 27. Consequently, the up counter in this register is prevented from counting the write strobe pulse in the next cycle of operation.

This operation of flip-flop 112 causes the output line 114 connected to its Q output terminal to go from ground to high, thereby enabling an AND gate 115 whose output 116 is connected to the "cursor enable" terminal of the input multiplexer 46 for the random access memory 27. Consequently, the cursor code will be enabled into the data input of the random access memory 27.

The AND gate 115 has two additional input lines 117 and 118 which are normally at high potential, so that when the potential on line 114 also goes high the AND gate 115 will be enabled. Line 117 is at high potential except when a key in the keyboard apparatus 21 is operated for moving the cursor. Line 118 is at high potential except during a "delete block operation, as described hereinafter.

The input multiplexer 46 normally connects the output of the recirculating memory 26 to the data input of the random access memory 27, but this normal enable circuitry in multiplixer 46 is disabled when the AND gate 115 is enabled, as described.

Figure 7:
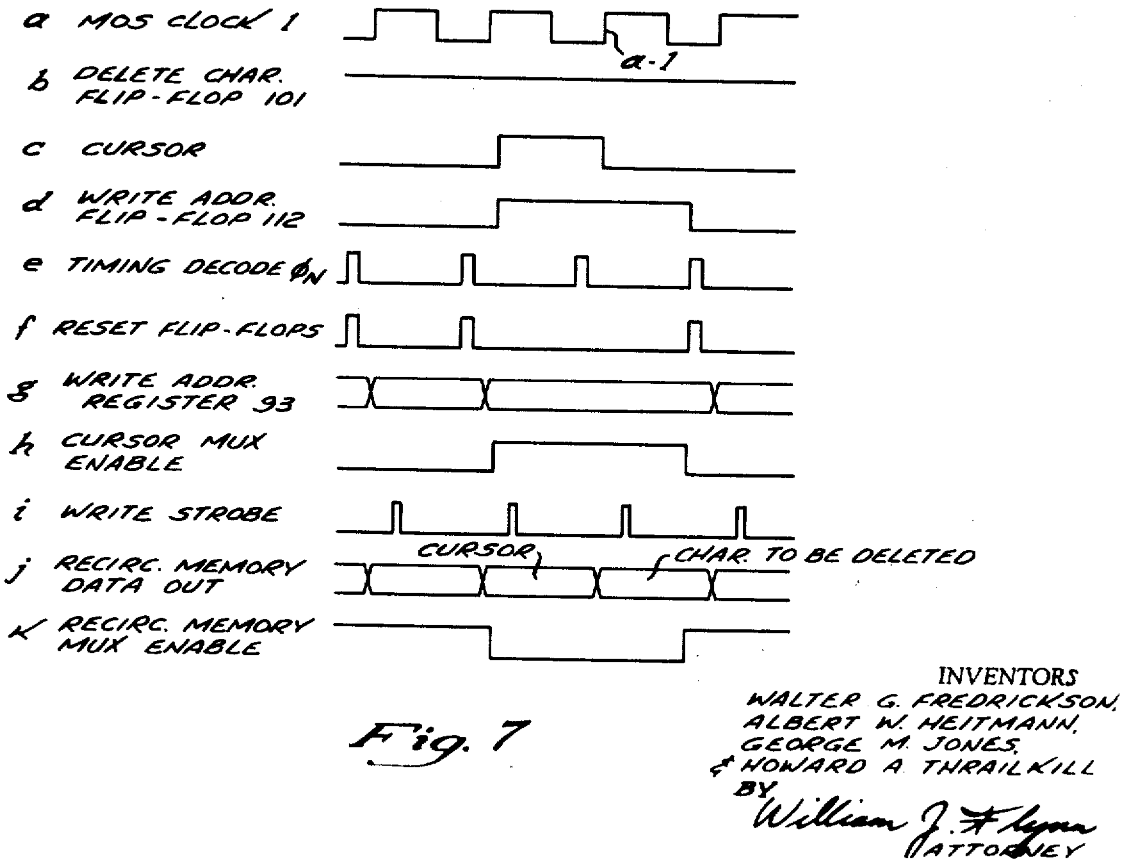
FIG. 7 is a timing diagram for the "delete character" mode of operation.

The foregoing operating sequence is illustrated schematically by the timing diagrams of FIG. 7. Line *a* of this figure shows the MOS clock 1 square wave pulses which control the recirculating memory 26. Each complete cycle of this clock pulse source takes 6 microseconds, during which interval a particular character address appears at the output of the recirculating memory 26.

Assuming that the "delete character" key in the keyboard apparatus 21 has been struck so that the delete character flip-flop 101 has been operated, as indicated at line *b*, and that SOD has appeared at the output of the recirculating memory, when the cursor code (line *c*) appears at the output of the recirculating memory the flip-flop 112 for disabling the write address register 93 for the random access memory 27 is operated, as indicated at line *d*.

As a result, when the positive-rise leading edge *a*–1 of the next clock pulse (line *a*) occurs, the write address register 93 (line *g*) is disabled. Normally, this register is toggled by the rising leading edge of each of these clock pulses so as to count up "one" for each such pulse.

During the 6 microsecond clock pulse interval immediately preceding this rising edge *a*–1 (while the cursor code is present at the output of the recirculating memory 26, as indicated at line *c*), the enable circuitry in the input multiplexer 46 which normally enables the output of the recirculating memory 26 into the data input of the random access memory 27 is disabled, as indicated at line *k*. At the same time the cursor enable circuitry in this input multiplexer is enabled, as indicated at line *h*. These actions take place before the write strobe pulse (line *i*) occurs in this clock pulse cycle (line *a*).

Then, in the next clock pulse cycle this same condition prevails until after the write strobe pulse in that cycle occurs. Consequently, the cursor code will be written again into the random access memory 27, but at the same address where it was written in the preceding 6 microsecond interval because the up counter in the write address register 93 is disabled now. Consequently, in this cycle the character which immediately followed the cursor code at the output of the recirculating memory 26 is prevented from being written into the random access memory 27, so that at the end of this 6 microsecond interval it disappears from the refresh memory 23 as a whole.

Toward the end of this cycle of the MOS clock 1 signal (line *a*) the flop-flops 101 and 112 are reset automatically when a phase 4 clock pulse (line *e*) occurs. This restores the system to normal operation. However, if the keyboard operator continues to hold the "delete character" key depressed for more than one second, the following characters will be deleted one at a time at a rate of about six per second until he releases the key. For this purpose a time delay circuit (not shown) is associated with the "delete character" input 128 to the AND gate 100 in FIG. 6 to provide a one second time delay before the flip-flop 101 can be operated after it has been reset in the manner now to be described.

Referring again to FIG. 6, the reset terminals R of both flip-flops 101 and 112 are connected to the output of an AND gate 119 through an OR gate 120 and additional circuitry to be described.

One input line 122 to the AND gate 119 is connected through an inverter 123 to the line 106 which is at ground potential as long as the cursor code is not present at the output of the recirculating memory 26. This input line 122 normally is at high potential and it goes to ground when the cursor code appears at the recirculating memory output. Then, in the next cycle of the master clock pulse source (line *a* of FIG. 7) when the cursor code is no longer present at the output of the recirculating memory 26, the potential at line 122 again goes high and it remains in that state until the next appearance of the cursor code at the output of the recirculating memory.

A second input line 124 to the AND gate 119 is connected through an OR gate 127 to the "delete character" input terminal 128, so that this line becomes positive when the "delete character" key in the keyboard apparatus 21 is depressed.

A third input line 125 to the AND gate is connected to line 107 and it goes positive following the appearance of SOD at the output of the counter comparator 173.

A fourth input line 126 is connected to a phase N clock pulse source (line *e* of FIG. 7) which produces a positive pulse toward the end of each 6 microsecond cycle interval of the master clock pulses (line *a* of FIG. 7).

With this arrangement, with the "delete character" key depressed and after the "start-of-display" code has appeared at the output of the recirculating memory 26, until the cursor code appears at the output of the recirculating memory the AND gate 119 will produce a ground output signal for resetting the flip-flops 112 and 101 each time the phase N clock pulse occurs. However, in the clock cycle when the cursor code is present at the output of the recirculating memory the input line 122 to AND gate 119 will be at ground, preventing the reset from occurring. Then, in the next cycle and as long as the "delete character" key remains operated, the AND gate 119 will provide a reset pulse each time the phase N clock pulse occurs.

The output of AND gate 119 is connected to one input terminal of an OR gate 120. The output of this OR gate is connected through an inverter 146 to one input terminal of an OR gate 147. The output of OR gate 147 is connected to one input terminal of an AND gate 148, whose output is connected to the reset terminals R of both flip-flops 112 and 101. AND gate 148 has a second input on line 149 which receives the phase N clock signal.

With this arrangement, when OR gate 120 receives a ground input signal from AND gate 119, a positive signal is applied to the first input terminal of AND gate 148. Then, when the next positive phase N clock signal appears on line 149, AND gate 148 is enabled and it resets both flip-flops 112 and 101.

When a delete character operation is performed, as just described, the word in which the deletion is made is automatically closed up so that an undesired space will not appear where the character was deleted. This automatic closing up takes place because the write address register 93 is disabled during the delete character operation, so that all of the characters which follow the deleted character will move to the next address, upstream with respect to the flow of data, in the random access memory.

Similarly, when a "delete line," "delete block" or "delete paragraph" operation is performed, as now to be described, the gap which would be caused by such deletion is immediately closed up automatically.

DELETE LINE

The keyboard apparatus 21 has a "delete line" key which may be operated to delete all of the line beginning at the cursor position.

However, due to the limited (32 character position) capacity of the random access memory 27, no more than 30 characters can be deleted in a single refresh cycle of the cathode ray tube. Normally, the write address register 93 for the random access memory is 30 character addresses ahead of the read address register. During the delete line mode, the write address register is disabled from counting up while the read address register is not so disabled, and this operation must be stopped when the read address register has caught up to the write address register. Under this condition the delete line operation is terminated for that refresh cycle and resumed the next refresh cycle.

A second condition for terminating the delete line operation is the appearance of the S* code at the output of the recirculating memory 26, which indicates that the end of this line of text has been reached.

Referring to FIG. 6, a flip-flop 130 has its input terminal T connected to a line 131 which receives a high potential when the "delete line" key in the keyboard apparatus is struck. Before this signal appears, terminal T is grounded, as is the Q output terminal of the flip-flop. Also, before this input signal appears, the output terminal $\overline{Q}$ is at the high potential of the D terminal.

When the input terminal T is driven positive by the operation of the "delete line" key, the flip-flop 130 is operated so that now a high potential appears at its Q output terminal, and its $\overline{Q}$ output terminal becomes grounded.

The $\overline{Q}$ output terminal of flip-flop 130 is connected by line 132 to an input terminal of the OR gate 110 in the same manner as the connection of the $\overline{Q}$ output terminal of flip-flop 101 to this OR gate, as previously described in detail. Consequently, the interaction between flip-flop 130 and flip-flop 108 is essentially similar to the already-described interaction between flip-flop 101 and flip-flop 108. Consequently, after the "delete line" key is operated and when the SOD counter comparison next appears at the output of the counter comparator 173, the flip-flop 108 is operated, causing a high potential to appear on line 107 connected to its Q output terminal.

The operation of flip-flop 130 in response to the operation of the "delete line" key causes a negative-going signal to appear on line 133, which is connected between the $\overline{Q}$ output terminal of this flip-flop and an input to the previously-mentioned OR gate 103 thereby causing the output line 104 from this OR gate to receive a high potential.

Consequently, the operation of the "delete line" key followed by the next appearance of SOD at the output of the counter comparator 173 has caused input lines 104 and 107 to the AND gate 105 to receive high (positive) signals. The third input line 106 to AND gate 105 receives a high potential the next time the cursor code appears at the output of the recirculating memory 26, as already described. Consequently, the AND gate 105 is enabled and the flip-flop 112 is operated in the manner already explained in the preceding discussion of the delete character mode.

Figure 8:
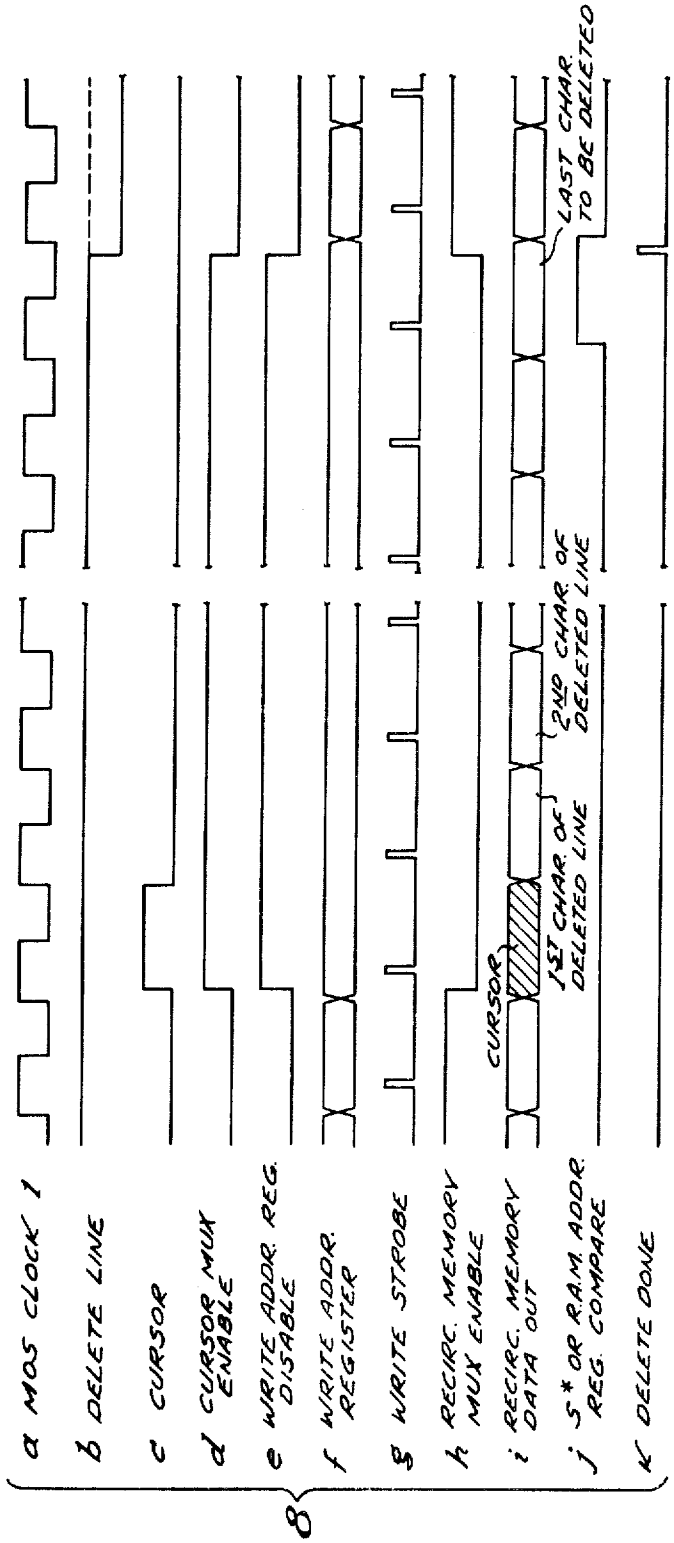
FIG. 8 is a timing diagram for the "delete line" mode of operation.

As shown in the timing diagrams of FIG. 8, this appearance of the cursor code (line *c*) and the resultant operation of flip-flop 112 has: (1) caused the cursor code to be enabled into the random access memory (line *d*); (2) disabled the normal output from the recirculating memory 26 into the random access memory (line *h*); and (3) disabled the write address register 93 for the random access memory (line *f*) from counting up in the cycles of the master clock (line *a*) following the cycle when the cursor code is present at the output of the recirculating memory 26.

In this operational mode, the resetting of flip-flop 112 is controlled by an AND gate 134 having its output connected to an input terminal of the OR gate 120.

A first input line 125a to AND gate 134 is connected by lines 125 and 107 to the Q output terminal of flip-flop 108, which goes positive when SOD appears at the output of the counter comparator 173 following the operation of the "delete line" key, as described.

A second input line 135 to AND gate 134 is connected to the Q output terminal of flip-flop 130, which goes positive when the "delete line" key is operated.

A third input line 136 to AND gate 134 is connected to receive a phase N clock signal during each cycle of the MOS clock 1 source (line *a* of FIG. 8).

A fourth input line 137 to AND gate 134 is connected to a terminal 138 which receives a positive signal when the S* (end-of-line) code appears at the output of the recirculating memory 26.

The resetting of the flip-flop 112 is also controlled by a signal which appears on line 139 leading into a second input to OR gate 147 when the read and write address registers of the random access memory 27 are at the same address position (which will happen at 30 character locations following the cursor).

The flip-flop 112 remains in its operated condition and is not reset until either the S* (end-of-line) code appears at the output of the recirculating memory or 30 character positions following that of the cursor code have been read out of the recirculating memory, whichever occurs sooner. Until such resetting does occur, the cursor code remains enabled into the data input of the random access memory (line *d* of FIG. 8), the output of the recirculating memory 26 remains disabled from the data input of the random access memory (line *h* of FIG. 8), and the write address register in the random access memory remains disabled (line *f* of FIG. 8).

If the S* code appears first, when the next phase N signal occurs all four inputs to AND gate 134 will be positive and therefore the flip-flop 112 will be reset in the manner previously described in detail.

Conversely, if the match between the read and write address registers of the random access memory occurs first, the signal on line 139 will enable the OR gate 147 to provide an output signal for causing the master delete flip-flop 112 to be reset.

If the resetting of flip-flop 112 occurred as a result of a match between the read and write address registers in the random access memory, so that the complete line has not been deleted, the "delete line" operation will be resumed the next time the cursor code appears at the output of the recirculating memory (i.e., about 1/60 second later).

When the S* code appears, enabling AND gate 134, the ground output signal from OR gate 120 which resets the master delete flip-flop 112, as described, also resets the delete line flip-flop 130, as follows:

The output of OR gate 120 is connected by line 163 to one input terminal of an AND gate 164, whose other input terminals are connected respectively to the Q output terminal of the master delete flip-flop 112 and the phase N clock line 126. Consequently, when the output of OR gate 120 is grounded and before the master delete flip-flop 112 has had time to be reset, AND gate 164 will be enabled, providing a ground output signal which enables an OR gate 165. A one-shot multivibrator, consisting of an AND gate 166, an inverter 167 and a capacitor 168, is connected to the output of OR gate 165 to produce a very brief negative pulse in response to the enabling of this OR gate. This negative pulse at the output of AND gate 166 is applied to the reset terminals of flip-flops 108 and 130 so as to clear both of them.

DELETE BLOCK

The delete block mode of operation requires the operator to define, by means of special keys in the keyboard apparatus 21, the beginning and the end of the text material which is to be deleted. When this is done, a special "define block" code is inserted in the refresh memory 23 just ahead of the first character in the block to be deleted, and the same code is inserted in the refresh memory immediately following the last character in this block. The block to be deleted may be any part of the 2000 character position content of the recirculating memory 26 which is displayed on the cathode ray tube or it may be the entire display, or up to 8000 characters in an expanded memory configuration of the described editing or proofing and correcting apparatus.

After the operator has defined the start and end of the block to be deleted, he initiates the delete block operational mode by depressing a special "delete block" key in the keyboard apparatus.

Referring to FIG. 6 again, the logic circuitry for the delete block mode includes a flip-flop 130b whose input terminal T receives a high positive potential on line 131b when the "delete block" key in the keyboard apparatus is struck. Before this signal appears, the input terminal T is grounded, the Q output terminal is grounded, and the $\overline{Q}$ output terminal is at the high positive potential of the D terminal.

The lines 132b and 133b which are connected to the $\overline{Q}$ output terminal of flip-flop 130b correspond to the similarly numbered lines associated with the delete line flip-flop 130. Consequently, it will be understood that the interaction between flip-flops 130b and 108 is essentially similar to that between flip-flops 130 and 108, and the interaction between flip-flop 130b and the OR gate 103 is essentially similar to that between flip-flop 130 and this OR gate.

An AND gate 140 has a first input connected to line 135b, coming from the "delete block" flip-flop 130b, and a second input connected to line 114, coming from the master delete flip-flop 112. When both these inputs are positive, AND gate 140 is enabled, causing a ground signal to appear on terminal 141, which is the "block enable" input terminal of the input multiplexer 46 for the random access memory 27.

The master delete flip-flop 112 is operated in response to the appearance of the first block code at the output of the recirculating memory 26. This produces a positive signal at terminal 142, which is connected to one input of an AND gate 143. A second input to this AND gate is from line 107, and a third input is from line 135b. With this arrangement, therefore, after the "delete block" key has been depressed (to operate flip-flop 130b), the next appearance of the first block code at the output of the recirculating memory will operate the master delete flip-flop 112, so that AND gate 140 is enabled.

Consequently, the write address register 93 is disabled, the normal data input into the random access memory 27 from the output of the recirculating memory 26 is disabled at the input multiplex 46, and the block code is enabled into the data input of the random access memory. Therefore, the data appearing at the output of the recirculating memory 26 is not written into the random access memory 27 and therefore disappears from the refresh memory 23 as a whole. The block code is written into the random access memory 27 repeatedly at the same address due to the fact that the write address register 93 is disabled, so that in the refresh memory the block code is "written over" (i.e., has replaced) all of the data codes in the block of text which was selected to be deleted.

The delete block operation is terminated in response to the appearance at the recirculating memory output of the second block code, which was inserted at the end of the block to be deleted.

In response to this second block code, a counter 144, connected to terminal 142, produces an enable signal on line 145 leading to one input terminal of an AND gate 134b. This AND gate has a second input connected by line 135b to the Q output terminal of the delete block flip-flop 130b, a third input connected by lines 125b, 125 and 107 to the Q output terminal of flip-flop 108, a fourth input on line 137*b* which receives a positive signal in response to the first block code, and a fifth input connected to lines 136 and 126 to receive a phase N clock signal.

With this arrangement, when the end of the defined block is reached, all signal inputs to AND gate 134*b* are positive, and the output signal from this AND gate enables OR gate 120 to reset the master delete flip-flop 112, as described. This terminates the delete block operation and the disabling of the write address register 93, so that normal operation of the write address register is resumed and now the data output from the recirculating memory 26 is again enabled into the random access memory 27 in the normal manner.

In any single refresh cycle (1/60 of a second) of the refresh memory 23 and the cathode ray tube 28, not more than 30 characters in a block can be deleted because after 30 deletions the read address register 200 for the random access memory 27 will have caught up to the write address register 93. In that event, a signal will appear on line 139 in FIG. 6 which causes the master delete flip-flop 112 to be reset, even though the end of the defined block has not been reached. However, the "delete block" operation resumes in the next refresh cycle and it continues in that refresh cycle until either the end of the defined block is reached or 30 delete operations are performed, whichever occurs first.

After the defined block of characters has been deleted, when OR gate 120 is enabled, as described, the delete block flip-flop 130*b* will be reset, via AND gate 164, OR gate 165, and multivibrator 166–168, along with flip-flop 108. The output of AND gate 166 is connected through an OR gate and an inverter 170 to the reset terminal R of the delete block flip-flop 130*b*.

DELETE PARAGRAPH

The delete paragraph mode of operation and the logic circuitry for it are basically similar to the already-described circuitry for the delete line mode. In FIG. 6, elements of the delete paragraph circuitry which correspond to those of the delete line circuitry are given the same reference numerals, with a "prime" suffix added, so that the detailed description need not be repeated completely.

This delete paragraph circuitry includes a flip-flop 130' having its $\overline{Q}$ output terminal connected to one input to the OR gate 110 at the input side of flip-flop 108 and to one input to the OR gate 103 at the input side of the master delete flip-flop 112. Consequently, both flip-flops 108 and 112 will be operated following the operation of the delete paragraph flip-flop 130' in response to the actuation of a "delete paragraph" key in the keyboard apparatus 21, which provides a positive input signal on line 131'.

Flip-flops 130', 108 and 112 remain operated until the occurrence of either a special end-of-paragraph code at the output of the recirculating memory 26 or the completion of 30 deletions, whichever occurs first.

As already described in detail, after 30 deletions in any one refresh cycle of the refresh memory 23 and the cathode ray tube 28 (1/60 second), a positive signal will appear on line 139. This will cause the master delete flip-flop 112 to be reset, but not flip-flop 108 nor the delete paragraph flip-flop 130'.

The resetting of flip-flops 108 and 130' in this operational mode is under the control of an AND gate 134', which has a positive input on its input line 135' following the operation of the delete paragraph flip-flop 130' in response to the manual actuation of the "delete paragraph" key in the keyboard apparatus 21.

The second input line 125*a'* to AND gate 134' receives a positive signal following the appearance of SOD at the output of the counter comparator 173.

The third input line 137' to AND gate 134' receives a positive signal in response to the appearance of a special end-of-paragraph code at the output of the recirculating memory, which is detected by the decoder 37.

The fourth input to AND gate 134' is connected to the phase N clock source.

With this arrangement, AND gate 134' will be enabled in response to the end-of-paragraph code, and the resulting operation of OR gate 120 will cause flip-flops 108 and 130', as well as the master delete flip-flop 112, to be cleared in response to the enabling of AND gate 164 and OR gate 165 and the operation of multivibrator 166–168. The reset terminal R of the delete paragraph flip-flop 130' is connected to the output of AND gate 166, so that it is reset at the same time as flip-flop 108 in the manner already described.

FULL WORD WRAP-AROUND

The display on the screen of the cathode ray tube is corrected immediately and automatically when there is not enough room for the last word in a line to be completed in that line. When this situation occurs, the entire word is moved down to the beginning of the next line on the screen.

FIG. 3 shows schematically the circuitry for performing this function, with certain parts omitted for clarity.

The output of the recirculating memory 26 is connected through the timing and control logic 24 to the input of the character counter 36 and to the input of a special character decoder 37, which will detect (among other special codes) a blank space (S) code or an S* code, which is to designate the end of the last character to be displayed in the line on the screen of the cathode ray tube. That is, the S* code is to determine the end of the line. It may occur before the last possible character position in the line is reached. The decoder 37 produces a ground true signal on line 47 when it detects an S code signal at the output of the recirculating memory 26. Similarly, the decoder 37 produces a ground true signal on line 48 when it detects an S* code signal at the output of the recirculating memory.

In the original text, an S code signal appears at each blank space in the text, usually between the last character in one word and the first character in the next. However, the original text does not have any S* codes. The S* codes are inserted automatically at the end of each line by the FIG. 3 circuitry, as explained hereinafter.

It will be apparent that at the end of a line of the original text, as determined by the character counter 36, two conditions are possible:

(1) a blank space code appears at the end of the line, so that an S code input to decoder 37 occurs when wrap around counter 36 reaches its final count and is ready ot re-cycle; or (2) a character code appears at the end of the line causing wrap around of the entire word in which that character code appears, as explained hereinafter.

Taking condition (1) first, the S code input signal to decorder 37 produces a signal on line 47 which causes an output from an OR gate 50 to be applied to one input line 41 to an AND gate 42. The wrap around counter 36, upon reaching its final count, produces a signal on second input line 43 to the AND gate 42. A third input to AND gate 42 is connected to line 59, which is positive unless a "disable wraparound" condition is established, which occurs only briefly during edit operations. Consequently, the AND gate 42 is now enabled and produces an output signal which is applied to one input line 44 to an OR gate 45, which then delivers an S* enable signal on line 45*a* to the input multiplexer 46 for the random access memory 27.

This multiplexer 46 enables various data inputs into the random access memory 27. In this case it enables the S* code as the data input into the random access memory, as previously explained in the section entitled "RAM INPUT MULTIPLEXER." The S* code input to the random access memory 27 writes over, or replaces, the S code signal which appeared in the original text, and it indicates that this is the end of the line. The input multiplexer 46 has suitable circuitry, described previously with reference to FIG. 12, which disables the normal data input into the random access memory 27 from the output of the recirculating memory 26 whenever the S* enable signal appears on line 45*a*. Accordingly, while the S* code is being written into the random access memory 27 the S code now appearing at the output of the recirculating memory is disabled from being written into the random access memory and when the next character position is read out of the recirculating memory this S code has now disappeared from the refresh memory 23 as a whole.

As already explained, the data in the random access memory 27 is fed back into the recirculating memory 26, so that when the data in this line of the text again appears at the output of the recirculating memory 26 in the next complete refresh or display cycle of the refresh memory 23 and the cathode ray tube 28 (1/60 of a second later), this S* code will be detected by the special character decoder 37. If the counter 36 is done, this S* code will cause an S* enable signal on line 45*a*, as described, to replace the S* code now appearing at the output of the recirculating memory 26 by a new S* code.

However, if the justification counter 36 is not done, the output of AND gate 42 will be high, and the occurrence of the S* code will enable an AND gate 39 which, through an OR gate 40, causes an S enable signal to appear on line 40*a*. This S enable signal causes the input multiplexer 46 to enable an S code as the data input into the random access memory to replace the S* code.

Thus, the system is in a continuous wraparound mode, erasing all the old S* codes and replacing them either by a new S code or a new S* code, either in the same or different locations, depending upon the wraparound counter 36.

If the previously-mentioned condition (2) occurs, then neither an S code nor an S* code will appear at the input of the special character decoder 37 when the wraparound counter 36 receives its final count, indicating that the end of the line has been reached. Under these conditions, the signals on both the $\overline{S}$ input line 47 and the $\overline{S}$* input line 48 to OR gate 50 will be positive, and OR gate 50 will provide a ground input signal to an AND gate 51. The other input to the AND gate 51 is high, being provided by a phase 2 clock write enable signal on line 52, which is a clock signal provided at this time from another portion of the timing and control logic 24. Consequently, the output line 57 from AND gate 51 will be positive at this time.

This positive clock signal on line 52 also is applied to one input of an OR gate 53. Another input to this OR gate is provided on the output line 54 from the character position counter 36. When this counter reaches its final count, line 54 goes to ground and the OR gate 53 provides a high output signal via line 55 to one input terminal of AND gate 56.

The AND gate 56 has a second high input via line 57 from the output of AND gate 51 and a third high input from the phase 2 clock write enable line 52. AND gate 56 has fourth input on line 58, which receives a phase L clock signal that is positive for only a small fraction of each 6-microsecond cycle. A fifth input, on line 59, to AND gate 56 is normally positive, becoming grounded only during certain edit operations.

The output of AND gate 56 is connected through an OR gate 62 and an inverter 63 to the previously-mentioned terminal 233 (FIG. 10) of the address multiplexer 67 for the random access memory 27. When this terminal is positive (which is the case as long as AND gate 56 is not enabled) the previously-described read address register 200 is enabled into the random access memory 27, as described in detail with reference to FIG. 10.

The read address register 200 receives input pulses as already explained with reference to FIG. 10.

However, during the brief portion of each 6-microsecond cycle of operation when the phase L signal on line 58 is positive and all the other inputs to AND gate 56 are positive, the AND gate 56 will be enabled, thereby grounding terminal 233 and disabling the read address register 200 from the random access memory. At this time, the output of the AND gate 56 is inverted by an inverter 64 to apply a positive enable signal to a terminal 65 of the address multiplexer 67 to enable the wrap write address register 61 into the random access memory 27 in the manner now to be described. Referring to FIG. 10, the wrap write address register comprises five flip-flops 401, 402, 403, 404, and 405, each of which is of the type that toggles in response to a positive signal on its T terminal and, when so toggled, applies the potential which is at its D input terminal to its Q output terminal. The D input terminals of flip-flops 401–405 are connected respectively to the Q output terminals of the corresponding flip-flops 202–206 in the write address register 93. Consequently, when a positive signal is applied to terminal 406, which is connected to the T input terminals of flip-flops 401–405, the potentials at the Q output terminals of the write address register flip-flops 202–206 will now appear at the Q output terminals of the corresponding flip-flops 401–405 in the wrap write address register 61.

A positive signal appears on terminal 406 when an S or an S* code appears at the output of the recirculating memory 26 and the write address clock is positive. As shown in FIG. 3, terminal 406 of the wrap write address register 61 is connected to the output of an AND gate 407 through an inverter 408. One input to this AND gate is connected to line 41, so that it receives a positive signal when either an S code or an S* code appears at the output of the recirculating memory 26. A second input terminal 409 for AND gate 407 receives a positive write address clock once each 6 microsecond cycle.

Accordingly, each time an S or S* code appears its address is transferred from the write address register 93 into the wrap write address register 61 until the next S or S* code appears.

The Q output terminals of flip-flops 401–405 in the wrap write address register 61 are connected to the inputs of respective AND gates 411–415, each of which has a second input connected to terminal 65. The outputs of these AND gates are connected respectively to the $2^0$, $2^1$, $2^2$, $2^3$ and $2^4$ output terminals of the address multiplexer 67 for the random access memory 27. It will be evident, therefore, that the AND gates 411–415 are part of this address multiplexer. Input terminal 65 receives a positive wrap write address clock when AND gate 56 is enabled, as described.

At the same time, the S* code is enabled into the data input of the random access memory 27 in response to the enabling of an AND gate 416 (FIG. 3) whose output is connected through the OR gate 45 to line 45*a*. One input to AND gate 416 is connected to the normally positive terminal 59. A second input to AND gate 416 is connected to the output of AND gate 56 through inverter 64. Consequently, when AND gate 56 is enabled, as described, AND gate 416 will be enabled and, through OR gate 45, it will provide an S* enable input on line 45*a* to the input multiplexer 46 for the random access memory 27.

Accordingly, as the data is read out of the recirculating memory 26 the wrap write address register 61 stores the address of each S or S* code in succession. When the end of the line is reached (with no S or S* code present there), register 61 will be storing the address of the last S or S* code which appeared in this line. At the end of this line the AND gate 56 is enabled, as described, so that the address multiplexer 67 now enables the wrap write address register 61 into the random access memory 27. Thus, the address of the last S or S* code which appeared in this line is enabled into the corresponding address of the random access memory 27. At the same time the S* code is enabled via input multiplexer 46 to the data input of the random access memory 27. In effect, therefore, the random access memory 27 is interrogated to locate the address therein of the last S code which occurred in this line of text and then the S* code now activated at the input multiplexer 46 is enabled into this address in the random access memory.

Consequently, the last S code signal which appeared in this line of text is replaced now in the random access memory 27 by an S* (end-of-line) signal. From the random access memory this S* code is fed back into the recirculating memory so that during the next refresh cycle of the cathode ray tube 28 and the refresh memory 23 (1/60 second later) the retrace of the cathode ray beam to begin displaying the next line of text will be initiated by the appearance at the output of the recirculating memory 26 of this S* code, which is now located in the last blank space in the present line of text (which theoretically may be anywhere within the 32 character spaces preceding the last character space in this line of the original text). That is, in the modified text the line is ended after the last word which can be completely accommodated in this line, and the following word (which would extend beyond the end of this line) now begins at the beginning of the next line on the screen of the cathode ray tube 28.

It is understood that the detection of the last S code in the line and its replacement by an S* code in the random access memory does not affect the cathode ray tube display which takes place during the refresh cycle when the detection takes place. That is, by the time the last S code in the line is "written over" by the S* code in the random access memory, this line has already been displayed, so that full-word wrap-around in the visual display cannot take place until the next refresh cycle.

In the refresh cycle which follows the detection of the last S code in the line and its replacement in the random access memory by an S* code, the appearance of this S* code at the output of the recirculating memory 26 is detected by the special decoder 37, which now provides a control signal input to the timing and control logic section 24 for causing the video amplifier 31 to blank the cathode ray beam and for causing the deflection circuits 32 to produce a horizontal retrace of the beam over to the beginning of the next line down on the screen of the cathode ray tube.

It should be understood that this full word wrap-around operation can occur automatically during any editing operation which makes it necessary. There is no need to interrupt the editing operation itself in order to achieve the full word wrap-around action.

From the foregoing it will be evident that the control circuitry just described is capable of correcting the end-of-line text display automatically and quite rapidly (1/60 second later) after determining that a graphic character word is running over the end of the line. That is, if the last space in the line is not a blank, this fact will be detected and automatically the entire last word in this line is shifted down to the beginning of the next line, where it will appear in the next refresh cycle. This quick response is possible because of the operation of the wrap write address register 61 in storing the address of the last blank space code, so that the end-of-line (S*) code can be enabled immediately into the corresponding address in the random access memory 27 so as to correct the display in the next refresh cycle (1/60 second later) following the cycle in which the undesired end-of-line overrun condition was detected.

PUNCHING OUT A BLOCK OF TEXT

Figure 13:
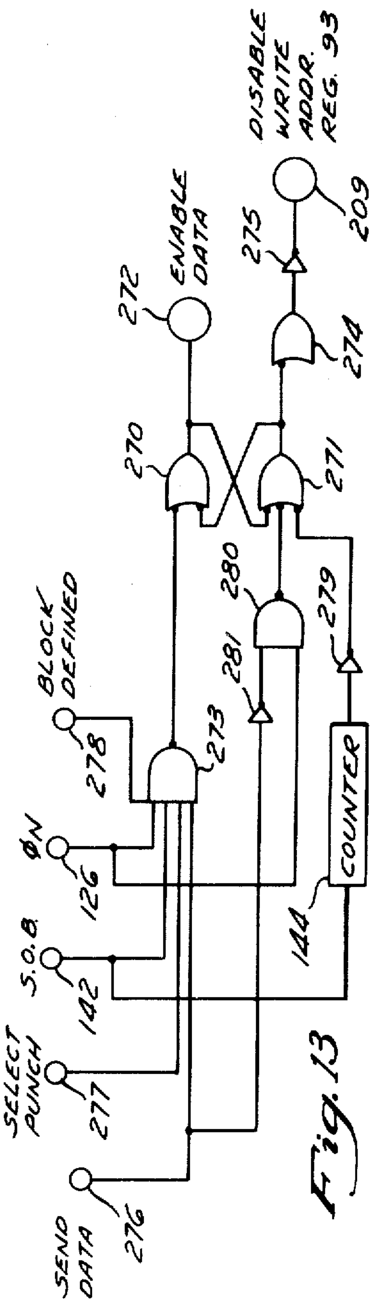
FIG. 13 illustrates schematically the circuitry in the present apparatus for connecting the data output of the recirculating memory to an output punch while at the same time deleting from memory the data transmitted to the punch.

FIG. 13 illustrates schematically the circuit used when the output punch 34 is to receive a block of text of any desired length which is defined by block codes at the beginning and the end, respectively. These block codes are inserted as explained in the preceding description of the "delete block" operation.

The enabling of data from the output of the recirculating memory 26 into the input of the punch 34 is under the control of a punch flip-flop comprising two cross-coupled OR gates 270 and 271. When the output terminal 272 of this flip-flop is positive, the data output of the recirculating memory 26 is enabled through the punch interface 33 into the output punch 34, so that the latter punches onto an output tape the graphic character and other data codes coming out of the recirculating memory serially. Also, at this time the signal on terminal 209 is at ground, so that the write address register 93 (FIG. 10) is disabled.

The OR gate 270 has one input connected to the output of an AND gate 273, so that when this AND gate is enabled, the punch flip-flop 270, 271 will be set terminal 272 will be positive and terminal 209 will be grounded.

The punch flip-flop will be reset to terminate the flow of data from the recirculating memory output to the punch 34 in response to an enable (ground) signal applied to any input terminal of the other OR gate 271 of this flip-flop. For this purpose the output of OR gate 271 is connected to a second input terminal of OR gate 270 and through an OR gate 274 and an inverter 275 to terminal 209.

The AND gate 273 has a first input from a terminal 276, which receives a positive signal from the punch interface 33 when the latter is ready to receive data from the output of the recirculating memory. In one practical embodiment, the punch operates at a speed of about 110 characters per second.

A second input terminal 277 for AND gate 273 becomes positive when the console operator actuates a "select punch" key in the keyboard apparatus.

A third input to AND gate 273 receives a positive signal from terminal 142 each time a block code appears at the output of the recirculating memory, as explained in the "DELETE BLOCK" mode of operation described with reference to FIG. 6.

A fourth input to AND gate 273 receives a positive phase N clock signal at terminal 126 at a predetermined time during each 6 microsecond interval when a particular data code is present at the output of the recirculating memory.

A fifth input to AND gate 273 receives a positive signal at terminal 278 when the block to be punched out has been properly defined.

With this arrangement, the first block code (which immediately precedes the block of data to be punched out) causes AND gate 273 to be enabled, thereby operating the punch flip-flop 270, 271. AND gate 273 is enabled as long as the "send data" signal at terminal 276 remains positive, which depends upon the rate at which the punch can operate. The operation of punch flip-flop 270, 271 causes the output of the recirculating memory to be enabled into the punch, as well as causing the write address register 93 to be disabled so that the normal data input from the output of the recirculating memory into the random access memory 27 is effectively disabled, and the data being transmitted to the punch is deleted from the refresh memory 23 as a whole.

When the second block code appears (at the end of the block of data to be punched out) the counter 144 (described previously with reference to FIG. 10) provides a positive signal which is inverted by an inverter 279 to enable the second OR gate 271 of the punch flip-flop. Consequently, the punch flip-flop is reset at this time so as to terminate the operation of the punch from the output of the recirculating memory.

OR gate 271 has another input which is connected to the output of an AND gate 280. This AND gate has a first input terminal which receives the phase N clock and a second input terminal which is connected to the "send data" terminal 276 through an inverter 281. With this arrangement, AND gate 280 is enabled and the punch flip-flop 270, 271 is reset when the positive "send data" signal at terminal 276 disappears, indicating that the punch 34 cannot accept data at this time. Since the data recirculation rate of the recirculating memory is much faster than the rate at which the punch can operate, not more than two data codes are transmitted from the recirculating memory to the punch during each 1/60 second refresh cycle of the refresh memory 23 and the cathode ray tube 28. These are the data codes which next follow the first block code in each refresh cycle.

When the data input to the punch is thus terminated during each refresh cycle, the normal recirculation of data from the output of the recirculating memory into the next available address in the random access memory is resumed for the remainder of that refresh cycle and continues until the first block code appears at the output of the recirculating memory in the next refresh cycle.

ROLL-UP, ROLL-DOWN

An important aspect of the present invention concerns a novel and convenient arrangement for selectively moving the text display either up or down, one line at a time, on the screen of the cathode ray tube 28. This enables the console operator to change, one line at a time, the displayed text in which editing changes may be made. The lines of text which move off the screen are retained in the memory, so that once a line has been completely edited it may be erased from the visual display but retained in memory for operating the output punch when the time comes.

In the roll-up mode of operation, the top line of text on the screen of the cathode ray tube is caused to disappear, with the previous second line moving up to become the new top line, and each following line of text moving up by one line position, and with a new bottom line being displayed.

Referring again to FIG. 2, the recirculating memory 26 has already been described as having a character position capacity substantially greater than can be displayed at one time on the screen of the cathode ray tube. It will be assumed for purposes of this discussion that the cathode ray screen is displaying a single 25-line column.

The previously-mentioned line counter arrangement 68 includes two counters 171 and 172.

Counter 171 is an up counter that counts the lines which follow the start-of-memory (SOM) code. Counter 171 is toggled up by a count of 1 in response to each end-of-line code appearing at the output of the recirculating memory 26. It is reset to zero by the start-of-memory (SOM) code.

Counter 172 is an up-down counter that acts essentially as a storage register for remembering which line past SOM should be the top line of the display. It is toggled up by 1 count when the "roll-up" key in the keyboard apparatus 21 is depressed. It is toggled down by one count when the "roll-down" key is depressed.

Assume that before a roll-down operation the SOD counter comparison appears in line 20 (line 1 being the line where the SOM code apears). Consequently the count stored in counter 172 will be 20. Counter 171 counts the lines after the SOM code, and it will reach a count of 20 when the SOD counter comparison appears. This match between counters 171 and 172 at line 20 is detected by comparison circuit 173, which now provides a control signal (SOD) on line 174 that causes the next line of text (line 21) to be displayed as the first line on the screen of the cathode ray tube. This comparison circuit 173 is essentially similar to the comparison circuit C for the read and write address registers 200 and 93, comprising a group of exclusive OR gates which make a bit-by-bit comparison between the two counters.

Now if the console operator strikes the "roll-up" key, this will cause counter 172 to toggle up by 1, so that the count stored in counter 172 now is 21. At line 20, the counts in the two counters 171 and 172 will not match each other.

However, at the end of line 21, the count in the up counter 171 will match the count stored in counter 172. The appearance of the S* code at the end of line 21 under this condition initiates a display of the next line as the top line on the CRT screen.

Consequently, as a result of operating the "roll-down" key, the SOD counter comparison has been moved from the end of line 20 to the end of line 21. Therefore, the first line to be displayed on the screen of the cathode ray tube 28 will be line 22. Consequently, line 21 following the SOM code has disappeared from the screen, line 22 has moved up to occupy the first line on the screen, all the following lines of text have moved up one line on the screen, and an additional line of text (which did not appear previously) now occupies the bottom line on the screen.

In a "roll-down" operation, if the console operator strikes the "roll-down" key this will cause the counter 172 to count down by 1 count from its assumed initial count of 20 down to 19. Consequently, there will be a count comparison between line counter 171 and storage counter 172 at line 19. Then, at the end of line 20 no SOD counter comparison will occur because the counters 171 and 172 do not match.

Consequently, the SOD counter comparison has been moved up from the end of line 20 to the end of line 19. Therefore, the first line of text to be displayed (on the first line of the screen of the cathode ray tube 28) will be line 20. Line 21 of the text and all of the following lines are moved down one line on the screen, and the line of text which occupied the bottom line on the screen disappears from the screen.

From the foregoing it will be clear that the disclosed embodiment of the present invention constitutes a novel and improved apparatus for making editing or proofing and correcting changes in a graphic text copy. The refresh memory 23 combines the low cost of the large capacity dynamic shift register with the ease of making editing changes in the small capacity random access memory. All of the different types of editing changes which may be made using the present apparatus are performed extremely rapidly so as not to interfere with the console operator's concentration on the display screen where he has to decide what further editing changes should be made. The novel roll-up, roll-down capability of the present apparatus is particularly convenient where the storage capacity of the refresh memory substantially exceeds the display capacity of the visual display.

While a presently-preferred embodiment of this invention has been described in detail with reference to the accompanying drawing, it is to be understood that various modifications, omissions and refinements which depart from the disclosed embodiment may be adopted without departing from the scope of this invention. For example, the MOS shift register may be replaced by a magnetic core memory, if desired.

We claim:

1. An editing apparatus for editing a train of data items and including memory means for storing said train of items, said memory means comprising a progressive memory having an input and an output and through which said train of data items travels and a non-progressive memory having a plurality of storage locations; said memory means outputting data at a frequency determining a timing period for said memory means, write means for writing successive data items from the output of the progressive memory into successively addressed storage locations of the non-progressive memory, read means for sequentially accessing said successively addressed storage locations and tracking said write means to read successive data items out of said storage locations of the non-progressive memory into the input of the progressive memory, timing means for actuating said read means and said write means in timed relationship to the movement of said data train through said progressive memory to sequentially address said storage locations, and editing means cooperating with said non-progressive memory for modifying the number of items in said data train comprising means cooperating with said timing means to vary said timed relationship in at least one of said read and write means to change the number of data items stored in said successively addressed locations between the write means and the read means on a change in the number of data items in said train.

2. An editing apparatus as defined in claim 1 wherein the number of storage locations for data items in said non-progressive memory exceeds the number of data items between said write means and said read means in the absence of editing operations.

3. An editing apparatus as defined in claim 1 wherein said editing means is effective to perform limited editing during each traversal of the entire data train through said memory means and said timing means comprises resetting means responsive to a signal for resetting each of said write and said read means to a predetermined initial storage location and to then effect the continued writing of said successive data items by said write means, and said apparatus includes circuit means for providing said signal when said data train reaches a predetermined position in said memory means, and read inhibit means for inhibiting operation of said read means for a predetermined number of data items subsequent to the resetting of said read means and said write means to establish a predetermined number of storage locations intermediate said read means and said write means in which the data items in said non-progressive memory are stored.

4. An editing apparatus as defined in claim 3 wherein said editing means comprises edit inhibit means responsive to the positions of said read and write means for inhibiting certan editing operations for the remainder of the current traversal of said data train when the number of storage locations between said read and write means becomes less than a minimum number.

5. An editing apparatus as defined in claim 3 wherein said editing means comprises edit inhibit means responsive to the positions of said read an write means for inhibiting certain editing operations for the remainder of the current traversal of said data train when the number of storage locations between said read and write means becomes greater than a maximum number.

6. An edition apparatus as defined in claim 3 wherein said editing means comprises edit inhibit means responsive to the positions of said read and write means for inhibiting certain editing operations for the remainder of the current traversal of said data train when the number of storage locations between said read and write means becomes less than a minimum number and for inhibiting certain editing operations for the remainder of the current traversal of said data train when the number of storage locations between said read and write means becomes greater than a maximum number.

7. An editing apparatus as defined in claim 3 wherein said circuit means comprises means responsive to a data item stored in said train.

8. An editing apparatus as defined in claim 1 wherein an item is to be deleted from said train, said editing means comprises delete means for deleting the item from the train comprising means cooperating with said timing means for changing the sequencing for at least a timing period of said write means from said timed relationship to prevent a change in the storage location addressed by the write means.

9. An editing apparatus as defined in claim 8 wherein said delete means comprises means for blocking data from being transmitted to said non-progressive memory from said progressive memory during a period in which said write means is inhibited.

10. An editing apparatus as defined in claim 8 in which said delete means comprises block delete means for deleting a plurality of successive items in said train comprising means for initiating a delete operation at a predetermined position in said train, said timing means comprising sequencing control means responsive to said block delete means and actuatable to a first state in response thereto to prevent the sequencing of said write means when an items is deleted and actuatable to a second state to restore the sequencing of said write means, first means for signaling when the number of said items to be deleted has been deleted, second means for signaling that the number of storage locations between said read and write means are less than a predetermined number, and means connecting said first and second means to said sequencing control means to actuate the latter to its second state to reinitiate the sequencing of the write means.

11. An editing apparatus as defined in claim 10 wherein said delete means comprises means for blocking data from being transmitted to said non-progressive memory from said progressive memory during a period in which said write means is inhibited.

12. An editing apparatus as defined in claim 10 wherein said block delete means comprises first and second data items circulating in the memory means in said data train to indicate the beginning and end of a section to be deleted, and means responsive to said first and second data items for actuating said control means between its said states.

13. An editing apparatus as defined in claim 10 further comprising output device means responsive to data items appearing at the output of said progressive memory to issue output data from said editing apparatus, and comprising gate means cooperating with said delete means to prevent transmission from said progressive memory to said nonprogressive memory of data items to be deleted, and enabling means responsive to said block delete means to actuate said data output device means while said sequencing control means is in said first state.

14. An editing apparatus as defined in claim 1 wherein said editing means comprises insertion means for inserting data into said train and said timing means comprises means for incrementing said write means to the next successive storage location for each item appearing at said output and for incrementing said write means in a plurality of steps during a timing period to a plurality of successive locations in response to said insertion means to write a plurality of items into said memory during the period.

15. An editing apparatus as defined in claim 14 in which said train of data includes a cursor code for indicating the position at which editing will occur in said train and said editing means comprises multiplexing means for inserting a cursor code into a storage location on one of said plurality of steps.

16. An editing apparatus as defined in claim 1 wherein said editing means cooperating with said nonprogressive memory comprises cursor means for producing a signal when said data train is at a predetermined position in said memory means and means responsive to said cursor means for initiating an editing operation.

17. An editing apparatus as defined in claim 1 wherein said non-progressive memory is a random access memory and said editing means further comprises register means responsive to a data item remembering a storage location of said random access memory into which a particular data item was written, and said write means further comprises write addressing means responsive to said register means for subsequently addressing said storage location, and said read means further comprises read addressing means responsive to said register means for subsequently addressing said storage location, whereby said storage location may be addressed for writing and reading at times in addition to sequentially addressed successive writing and reading times.

18. An editing apparatus having editing means for modifying coded data stored in the apparatus, the data representing information to be reproduced in lines, display means for displaying said data by frames, each of which comprises a plurality of lines, memory means for storing a number of lines of data to be edited which is greater than said plurality and for continuously outputting the data in sequence, and display control means comprising circuit means for limiting the response of said display means to a portion of the data being outputted by said memory means with said portion corresponding to said plurality of lines including first means for rendering said display means responsive to the outputted data beginning at a first line and terminating at a subsequent line, and scrolling means cooperating with said first means to incrementally shift the portion of the output data to which the display means is responsive to shift the lines of the outputted data which are displayed.

19. An editing apparatus as defined in claim 18 wherein said data includes end of line codes for terminating a line of display on said display means and wherein said first means for rendering said display means responsive comprises start circuit means responsive to said end of line codes for initiating the display at a selected line.

20. An editing apparatus as defined in claim 19 wherein said start circuit means comprises a counter incremented in response to an end of line code.

21. An editing apparatus as defined in claim 19 wherein said first means for rendering said display means responsive comprises terminate means responsive to said end of line codes for terminating the display on said display means.

22. An editing apparatus as defined in claim 21 wherein said terminate means comprises a counter.

References Cited

UNITED STATES PATENTS

| | | | |
|---|---|---|---|
| 3,501,746 | 3/1970 | Vosbury | 340—172.5 |
| 3,500,335 | 3/1970 | Cuccio | 340—172.5 |
| 3,540,012 | 11/1970 | Ehrman | 340—172.5 |
| 3,346,853 | 10/1967 | Koster et al. | 340—172.5 |
| 3,364,473 | 1/1968 | Reitz et al. | 340—172.5 |
| 3,581,290 | 5/1971 | Sugarman | 340—172.5 |
| 3,582,936 | 6/1971 | Kite et al. | 340—172.5 X |
| 3,593,310 | 7/1971 | Kievit | 340—172.5 |

PAUL J. HENON, Primary Examiner

M. B. CHAPNICK, Assistant Examiner